United States Patent
Dempo

(10) Patent No.: US 8,798,081 B2
(45) Date of Patent: Aug. 5, 2014

(54) EVENT DELIVERY SYSTEM, RENDEZVOUS NODE, BROKER NODE, LOAD DISTRIBUTION METHOD FOR EVENT DELIVERY SYSTEM, LOAD DISTRIBUTION METHOD FOR RENDEZVOUS NODE, DELIVERY ROUTE CONSTRUCTION METHOD FOR BROKER NODE, STORAGE MEDIUM STORING LOAD DISTRIBUTION PROGRAM, AND STORAGE MEDIUM STORING DELIVERY ROUTE CONSTRUCTION PROGRAM

(75) Inventor: Hiroshi Dempo, Tokyo (JP)

(73) Assignee: NEC Corporation, Tokyo (JP)

( * ) Notice: Subject to any disclaimer, the term of this patent is extended or adjusted under 35 U.S.C. 154(b) by 415 days.

(21) Appl. No.: 13/147,665

(22) PCT Filed: Jan. 22, 2010

(86) PCT No.: PCT/JP2010/000371
§ 371 (c)(1),
(2), (4) Date: Aug. 3, 2011

(87) PCT Pub. No.: WO2010/092751
PCT Pub. Date: Aug. 19, 2010

(65) Prior Publication Data
US 2011/0292804 A1    Dec. 1, 2011

(30) Foreign Application Priority Data

Feb. 16, 2009  (JP) .................................. 2009-032599

(51) Int. Cl.
*H04L 9/00*    (2006.01)
(52) U.S. Cl.
USPC ......................................... 370/401; 370/408

(58) Field of Classification Search
None
See application file for complete search history.

(56) References Cited

U.S. PATENT DOCUMENTS 6,959,393 B2 *  10/2005  Hollis et al. ..................... 726/21
7,287,089 B1 *  10/2007  Lamoureux et al. .......... 709/238
(Continued)

FOREIGN PATENT DOCUMENTS

| CN | 1567891 A | 1/2005 |
| JP | 2001211204 A | 8/2001 |
| JP | 2002009798 A | 1/2002 |

OTHER PUBLICATIONS

International Search Report for PCT/JP2010/000371 mailed Feb. 16, 2010.

(Continued)

*Primary Examiner* — Jay P Patel
(74) *Attorney, Agent, or Firm* — Sughrue Mion, PLLC

(57) ABSTRACT

Provided is an event delivery system where a bottleneck on the system can be eliminated by reducing load on a rendezvous node. The event delivery system includes publisher nodes, subscriber nodes, the rendezvous node, and broker nodes. The rendezvous node includes a traffic monitoring means that monitors the traffic volume of event information issued by the publisher node, and a specific event determination means that determines specific event information subject to load distribution from among the event information when the traffic volume exceeds a predetermined value. Each broker node includes a route defection means that detects whether its own node is an aggregation point node or a branch point node of the delivery route of the specific event information, and a route construction means that constructs a new delivery route of the specific event information going through the aggregation point node and the branch point node, bypassing the rendezvous node.

44 Claims, 18 Drawing Sheets

(56) References Cited

U.S. PATENT DOCUMENTS

| | | | |
|---|---|---|---|
| 8,234,296 B1* | 7/2012 | Black | 707/769 |
| 8,538,981 B2* | 9/2013 | Navas | 707/769 |
| 2003/0202663 A1* | 10/2003 | Hollis et al. | 380/282 |
| 2006/0168317 A1 | 7/2006 | Charzinski et al. | |
| 2008/0133643 A1* | 6/2008 | Lamoureux et al. | 709/201 |
| 2009/0138393 A1* | 5/2009 | Lemons et al. | 705/35 |
| 2010/0125545 A1* | 5/2010 | Navas | 707/602 |
| 2010/0125574 A1* | 5/2010 | Navas | 707/722 |
| 2010/0125584 A1* | 5/2010 | Navas | 707/747 |
| 2011/0081955 A1* | 4/2011 | Lange et al. | 463/6 |
| 2013/0138476 A1* | 5/2013 | Lamoureux et al. | 705/7.29 |

OTHER PUBLICATIONS

P. R. Pietzuch, "Hermes: A scalable event-based middleware", Technical Report, Computer Laboratory, University of Cambridge, No. 590, UCAM-CL-TR590, ISSN 1476-2986, Jun. 2004.

Chinese Office Action for CN Application No. 201080008025.6 issued on Sep. 3, 2013 with Partial English Translation.

* cited by examiner

| EVENT TYPE NAME | ADVERTISEMENT INFORMATION (a1, a2) | TRANSMISSION SOURCE | ADJACENT TRANSFER DESTINATION |
|---|---|---|---|
| Name#1 | Adv11 | B21 | R31 |
| | Adv12 | B21 | R31 |
| Name#2 | Adv21 | B22 | R31 |
| | Adv22 | B22 | R31 |

Fig. 5

| EVENT TYPE NAME | REQUEST INFORMATION (s1, s2) | TRANSMISSION SOURCE | ADJACENT TRANSFER DESTINATION |
|---|---|---|---|
| Name#1 | Sub11 | B26 | R31 |
| | Sub12 | B26 | R31 |
| Name#2 | Sub21 | B25 | R31 |
| | Sub22 | B25 | R31 |

Fig. 6

```
<Publish>
        <EventType name="TemperatureMoreThan20">
                <Place>TokyoStation</Place>
                <GlobalPosition ID="0001">
                        <AreaOfLatitude>North</AreaOfLatitude>
                        <DegreeOfLatitude>35</DegreeOfLatitude>
                        <AreaOfLongitude>East</AreaOfLongitude>
                        <DegreeOfLongitude>139</DegreeOfLongitude>
                </GlobalPosition>
        </EventType>
        <Notification>
                <Temperature>21</Temperature>
        </Notification>
</Publish>
```

Fig. 8

```
<Advertisement>
        <EventType name="TemperatureMoreThan20">
                <Place>TokyoStation</Place>
                <GlobalPosition ID="0001">
                        <AreaOfLatitude>North</AreaOfLatitude>
                        <DegreeOfLatitude>35</DegreeOfLatitude>
                        <AreaOfLongitude>East</AreaOfLongitude>
                        <DegreeOfLongitude>139</DegreeOfLongitude>
                </GlobalPosition>
        </EventType>
</Advertisement>
```

Fig. 9

```
<Subscribe>
    <xpath>
            </EventType[@Name='TemperatureMoreThan20')
            and(/EventType/Place[.='TokyoStation'])
            and(/EventType/GlobalPosition[@ID='0001'])
    </xpath>
</Subscribe>
```

Fig. 10

| EVENT TYPE NAME | Advertisement ELEMENT/ATTRIBUTE INFORMATION SET | TRANSMISSION SOURCE | ADJACENT TRANSFER DESTINATION |
|---|---|---|---|
| TemperatureMoreThan20 | GlobalPosition ID IN TOKYO STATION =Advertisement INFORMATION OF "0001" | B121/N151 | R131 |
| | GlobalPosition ID IN TOKYO STATION =Advertisement INFORMATION OF "0002" | B121/N151 | R131 |
| | GlobalPosition ID IN TOKYO STATION =Advertisement INFORMATION OF "0003" | B121/N151 | R131 |
| | GlobalPosition ID IN YOKOHAMA STATION =Advertisement INFORMATION OF "0001" | B122/N152 | R131 |
| | GlobalPosition ID IN YOKOHAMA STATION =Advertisement INFORMATION OF "0002" | B122/N152 | R131 |
| | GlobalPosition ID IN YOKOHAMA STATION =Advertisement INFORMATION OF "0003" | B122/N152 | R131 |
| | GlobalPosition ID IN KAWASAKI STATION =Advertisement INFORMATION OF "0001" | P131 | R131 |
| | GlobalPosition ID IN KAWASAKI STATION =Advertisement INFORMATION OF "0002" | P131 | R131 |
| | GlobalPosition ID IN KAWASAKI STATION =Advertisement INFORMATION OF "0003" | P131 | R131 |

Fig. 11

| EVENT TYPE NAME | Subscription ELEMENT/ATTRIBUTE INFORMATION SET | TRANSMISSION SOURCE | ADJACENT TRANSFER DESTINATION |
|---|---|---|---|
| TemperatureMoreThan20 | GlobalPosition ID IN TOKYO STATION =Subscription INFORMATION OF "0001" | B126/N155 | R131 |
| | GlobalPosition ID IN TOKYO STATION =Subscription INFORMATION OF "0002" | B126/N155 | R131 |
| | GlobalPosition ID IN TOKYO STATION =Subscription INFORMATION OF "0003" | B126/N155 | R131 |
| | GlobalPosition ID IN YOKOHAMA STATION =Subscription INFORMATION OF "0001" | B125/N156 | R131 |
| | GlobalPosition ID IN YOKOHAMA STATION =Subscription INFORMATION OF "0002" | B125/N156 | R131 |
| | GlobalPosition ID IN YOKOHAMA STATION =Subscription INFORMATION OF "0003" | B125/N156 | R131 |

Fig. 12

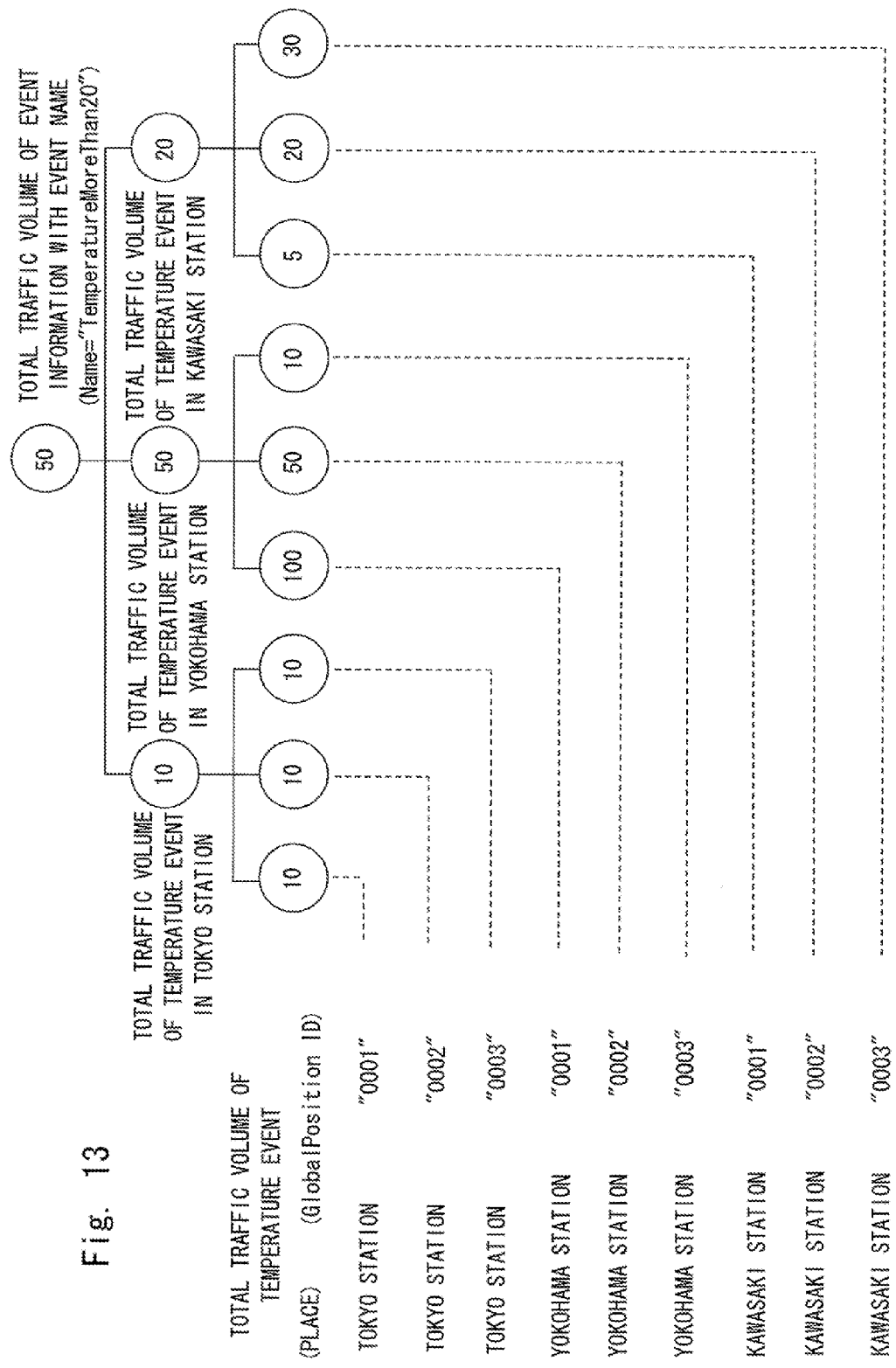

```
<ModifyRouteForSubscriber>
        <xpath>
                </EventType[@Name='TemperatureMoreThan20')
                and(/EventType/Place[.='YokohamaStation'])
        </xpath>
</ModifyRouteForSubscriber>
```

Fig. 14

```
<ReplyToModifyRouteForSubscriber>
        <EventType name="TemperatureMoreThan20">
                <Place>YokohamaStation</Place>
        </EventType>
        <HandoverTo>N154</HandoverTo>
</ReplyToModifyRouteForSubscriber>
```

Fig. 15

```
<ModifyRouteForPublisher>
        <xpath>(/EventType[@Name='TemperatureMoreThan20')
                and (/EventType/Place[.='YokohamaStation')
        </xpath>
        <HandoverTo>N154</HandoverTo>
</ReplyToModifyRouteForSubscriber>
```

Fig. 16

```
<ModifyRouteForSubscriber>
        <xpath>(/EventType[@Name='TemperatureMoreThan20')
                and (/EventType/Place[.='YokohamaStation')
                and (/EventType/GlobalPosition[@ID='0001'])
        </xpath>
</ModifyRouteForSubscriber>
```

EVENT DELIVERY SYSTEM, RENDEZVOUS NODE, BROKER NODE, LOAD DISTRIBUTION METHOD FOR EVENT DELIVERY SYSTEM, LOAD DISTRIBUTION METHOD FOR RENDEZVOUS NODE, DELIVERY ROUTE CONSTRUCTION METHOD FOR BROKER NODE, STORAGE MEDIUM STORING LOAD DISTRIBUTION PROGRAM, AND STORAGE MEDIUM STORING DELIVERY ROUTE CONSTRUCTION PROGRAM

TECHNICAL FIELD

The present invention relates to an event delivery system that, upon occurrence of a state change in a given observation target, computerizes the state change and notifies the state change to recipients who desire for the delivery of the information, a rendezvous node thereof, a load distribution method therefor and a storage medium storing a load distribution program, a broker node of the event delivery system, a delivery route construction method therefor, and a storage medium storing a delivery route construction program.

BACKGROUND ART

An event delivery system that, upon occurrence of a state change in a given observation target, computerizes the state change and notifies the state change to recipients who desire for the delivery of the information is known (refer to Non-Patent Literature 1, for example). FIG. 1 is an example of a related event delivery system. The event delivery system of FIG. 1 is composed of publisher nodes (P1, P2), broker nodes (B1 to B5), a rendezvous node R at the top of an event delivery tree, and subscriber nodes (S1, S2). The event delivery system of FIG. 1 operates as follows.

The publisher node P1 that intends to issue an event first advertises the event. As shown in FIG. 1, the advertisement processing is executed by transmitting advertisement information a1 from the publisher node P1 to the rendezvous node R. The broker node B1 creates a routing table for advertisement when it receives the advertisement information a1 from the publisher node P1. Specifically, it creates setting of:

Transmission source (Publisher node P1)-Transfer destination (Rendezvous node R).

The route Rt1 of the event delivery path which is created at this point:

(Publisher node P1)-(Broker node B1)-(Rendezvous node R)

is used when the publisher node P1 issues event information p1.

The publisher node P2 that intends to issue an event also performs the same processing, that is, advertises advertisement information a2 to the rendezvous node R. The transmission of the advertisement information a2 to the rendezvous node R is terminated at the broker node B2. This occurs when the same type of event is advertised, for example, in the case where the advertisement information a1 and the advertisement information a2 are in an inclusive relation. In FIG. 1, because the advertisement information a1 has already advertised the delivery route of:

(Broker node B1)-(Rendezvous node R), the delivery route set for the advertisement information a1 is used as the delivery route from the broker node B1 to the rendezvous node R for the advertisement information a2.

On the other hand, the subscriber node S1 that intends to receive the advertised event transmits request information s1 for receiving the event to the rendezvous node R. The request information s1 reaches the rendezvous node R through the route Rt2:

(Subscriber node S1)-(Broker node B3)-(Broker node B1).

in FIG. 1. Further, the request information s1 is transferred also to the broker node B2. This occurs when conditions for the advertisement information a2 that intends to advertise the event information p1 and the request information s1 that intends to receive the event information p1 match. To be more specific, the broker node B3 and the broker node B1 on the path through which the request information s1 is transferred refer to the routing table that is constructed at the time of transferring the advertisement information a1 to the rendezvous node R. In this reference, if conditions for the event to be advertised and the event to be received match, the request information s1 is transferred in the reverse direction through the route constructed for the advertisement information a1. Specifically, in FIG. 1, the request information s1 is transferred from the broker node B1 to the broker node B2. Although not shown in FIG. 1, the event that is advertised by the advertisement information a2 based on this processing is delivered as event information p2 through the delivery route of:

(Publisher node P1)-(Broker node B2)-(Broker node B1)-(Broker node B3)-(Subscriber node S1)

when a state change occurs in the publisher node P2.

CITATION LIST

Non-Patent Literature

Non-Patent Literature 1: Peter R. Pietzuch, "Hermes: A scalable event-based middleware", Computer Laboratory, University of Cambridge, June 2004, Chapter 4.3.5

SUMMARY OF INVENTION

Technical Problem

However, the above-described event delivery system has a problem that the rendezvous node is subject to a bottleneck on the system. The reason is as follows.

In the event delivery system shown in FIG. 1, there is a possibility that a route which causes heavy load on the rendezvous node R is constructed. For example, when delivering the event information p1 from the publisher node P1 to the subscriber node S2, there is a possibility that the route Rt3:

(Publisher node P1)-(Broker node B1)-(Rendezvous node R)-(Broker node B5)-(Subscriber node S2)

as shown in FIG. 1 is constructed. This occurs when a delivery path such as the route Rt1 constructed for the advertisement information a1 is not detected in the process of transferring the request information s2 to the rendezvous node R.

On the rendezvous node, functions for performing event information management for event advertisement and event reception registration are concentrated. If the event delivery route that goes through the rendezvous node is formed as described above, the load on the rendezvous node increases, and the throughput of the rendezvous node decreases.

Therefore, an object of the present invention is to provide a technique to solve the above problem. Specifically, an object of the present invention is to provide an event delivery system in which a bottleneck on the system can be eliminated by reducing load on a rendezvous node, a rendezvous node, a broker node, a load distribution method for an event delivery system, a load distribution method for a rendezvous node, a delivery route construction method for a broker node, a storage medium storing a load distribution program, and a storage medium storing a delivery route construction program.

Solution to Problem

The present invention reduces load on a rendezvous node by constructing a delivery route for delivering event information, bypassing the rendezvous node.

Specifically, the event delivery system according to the present invention includes a publisher node that issues event information containing a content of a generated event and advertisement information advertising the event, a subscriber node that issues request information for receiving event information of a desired event among the event, a rendezvous node that makes information management related to the event, and a broker node that transfers the event information and the advertisement information issued by the publisher node, and the request information issued by the subscriber node. The rendezvous node includes a traffic monitoring means for monitoring a traffic volume of the event information issued by the publisher node, and a specific event determination means for determining specific event information subject to load distribution from among the event information when the traffic volume monitored by the traffic monitoring means exceeds a predetermined value. The broker node includes a route detection means for detecting whether the broker node is an aggregation point node or a branch point node for changing a current delivery route of the specific event information, and a route construction means for constructing a new delivery route of the specific event information going through the aggregation point node and the branch point node detected by the route detection means, bypassing the rendezvous node.

The rendezvous node is included in an event delivery system to deliver event information containing a content of an event generated in a publisher node to a subscriber node, and includes a traffic monitoring means for monitoring a traffic volume of the event information passing through the rendezvous node, and a specific event determination means for determining specific event information subject to load distribution from among the event information when the traffic volume monitored by the traffic monitoring means exceeds a predetermined value.

The broker node is included in an event delivery system to deliver event information containing a content of an event generated in a publisher node to a subscriber node, and includes a route detection means for detecting whether the broker node is an aggregation point node or a branch point node for changing a current delivery route of specific event information subject to load distribution from among the event information, and a route construction means for constructing a new delivery route of the specific event information going through the aggregation point node and the branch point node detected by the route detection means, bypassing a rendezvous node included in the event delivery system.

Further, a load distribution method for an event distribution system according to the present invention includes monitoring a traffic volume of event information issued by a publisher node that issues event information containing a content of a generated event and advertisement information advertising the event at a rendezvous node that makes information management related to a generated event, determining specific event information subject to load distribution from among the event information when the traffic volume monitoring exceeds a predetermined value, performing route detection for detecting an aggregation point node and a branch point node for changing a current delivery route of the specific event information determined by the specific event determination from among broker nodes that transfer the event information and the advertisement information issued by the publisher node and request information issued by a subscriber node that issues request information for receiving desired event information, and performing route construction for constructing a new delivery route of the specific event information going through the aggregation point node and the branch point node detected by the route detection, bypassing the rendezvous node.

Furthermore, a load distribution method for a rendezvous node according to the present invention includes monitoring a traffic volume of event information passing through a rendezvous node by the rendezvous node included in an event delivery system to deliver event information containing a content of an event generated in a publisher node to a subscriber node, and determining specific event information subject to load distribution from among the event information when the traffic volume monitored by the traffic monitoring exceeds a predetermined value.

Advantageous Effects of Invention

The present invention can provide an event delivery system in which a bottleneck on the system can be eliminated by reducing the load on a rendezvous node, load distribution method therefore, and a storage medium storing load distribution program.

BRIEF DESCRIPTION OF DRAWINGS

FIG. 5 is a view illustrating an advertisement information table held by a broker node of the event delivery system according to the present invention;

FIG. 6 is a view illustrating a request information table held by a broker node of the event delivery system according to the present invention;

FIG. 8 is an example of event information delivered in an example of the event delivery system according to the present invention;

FIG. 9 is an example of advertisement information delivered in an example of the event delivery system according to the present invention;

FIG. 10 is an example of request information delivered in an example of the event delivery system according to the present invention;

FIG. 11 is a view illustrating an advertisement information table held by a broker node in an example of the event delivery system according to the present invention;

FIG. 12 is a view illustrating a request information table held by a broker node in an example of the event delivery system according to the present invention;

FIG. 13 is a view illustrating a traffic volume of a rendezvous node in an example of the event delivery system according to the present invention;

FIG. 14 is an example of a downstream event delivery route change message generated and transmitted by a rendezvous node in an example of the event delivery system according to the present invention;

FIG. 15 is an example of a response message by a broker node in an example of the event delivery system according to the present invention;

FIG. 16 is an example of an upstream event delivery route change message generated and transmitted by a rendezvous node in an example of the event delivery system according to the present invention;

FIG. 17 is an example of a downstream event delivery route change message used by a broker node at the time of changing a delivery route in an example of the event delivery system according to the present invention;

DESCRIPTION OF EMBODIMENTS

Figure 1:
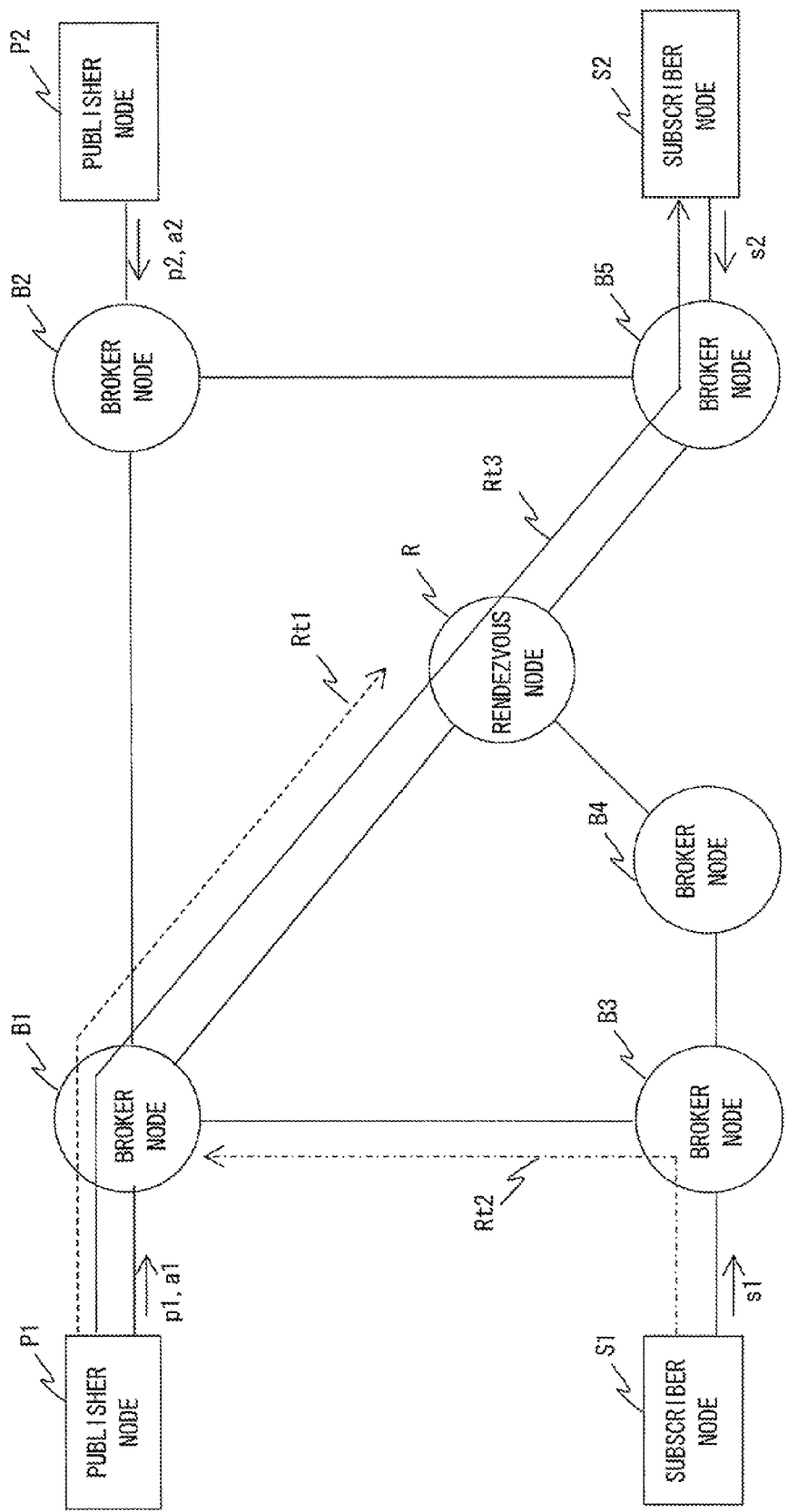
FIG. 1 is a schematic block diagram of a related event delivery system.

Exemplary embodiments of the present invention will be described with reference to the appended drawings. The exemplary embodiments described hereinbelow are merely examples of the configuration of the present invention, and the present invention is not limited to the below-described exemplary embodiments. Note that, in this specification and the drawings, structural elements denoted with the same reference numerals are identical to one another.

Figure 2:
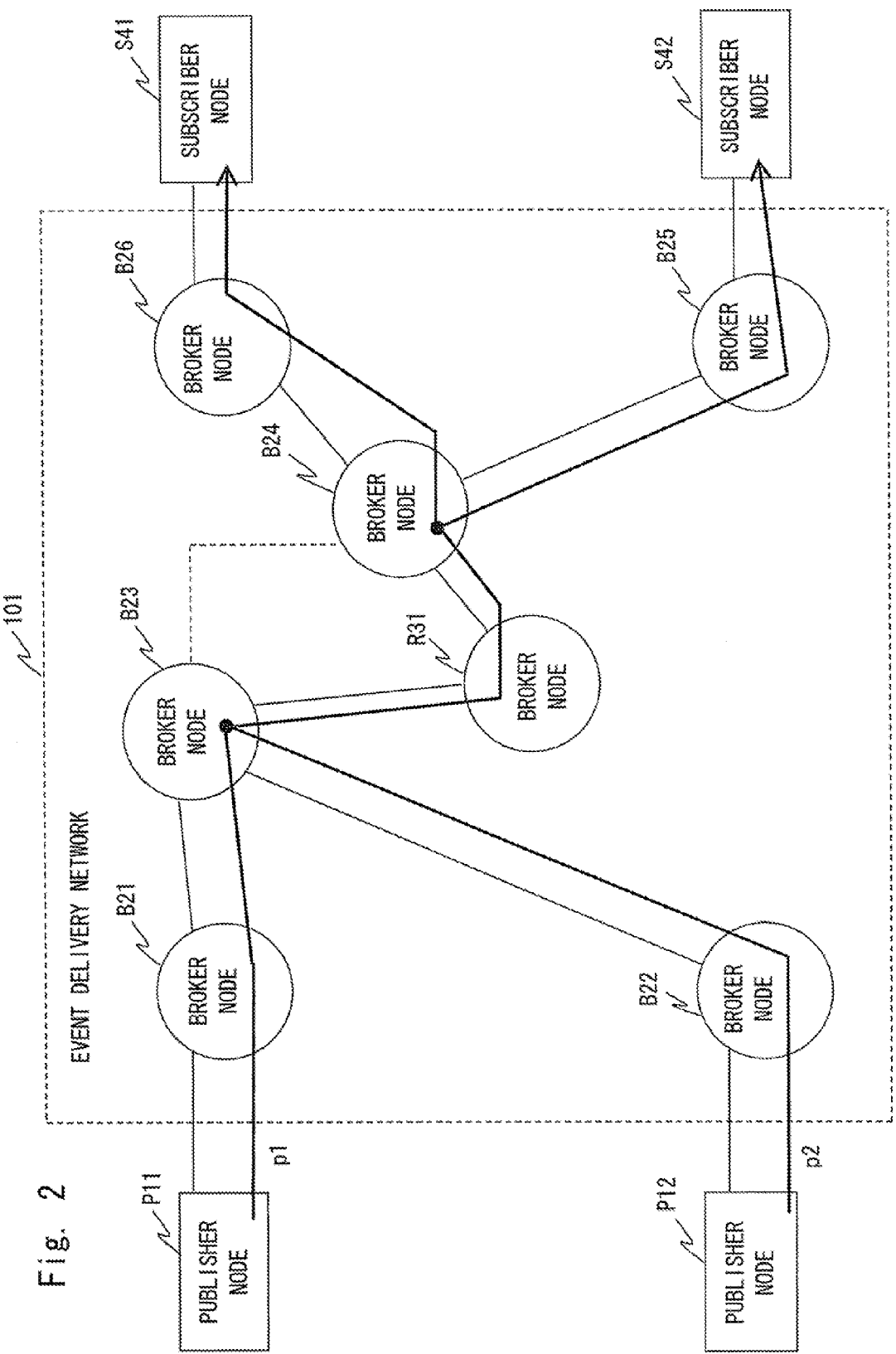
FIG. 2 is a schematic block diagram of an event delivery system according to the present invention.

FIG. 2 is a schematic block diagram of an event delivery system according to the exemplary embodiment. The event delivery system is composed of an event delivery network 101 and terminals connected thereto. The event delivery network 101 includes broker nodes (B21 to B26) that route event information and a rendezvous node R31. The event delivery network 101 is a network having a multicast tree architecture with terminals at the bottom and the rendezvous node R31 at the top, for example. The terminals include publisher nodes (P11, P12) that issue event information (p1, p2) and advertisement information (a1, a2), and subscriber nodes (S41, S42) that issue request information (s1, s2) requesting an event and receive the event information (p1, p2).

In the event delivery system shown in FIG. 2, the terminals are connected as follows. The publisher node P11 is connected to the broker node B21. The publisher node P12 is connected to the broker node B22. The subscriber node S41 is connected to the broker node B26. The subscriber node S42 is connected to the broker node B25. In FIG. 2, the heavy solid line arrow indicates a delivery route of the event information (p1, p2) issued from the publisher nodes (P11, P12). The event information is aggregated at the broker node B23, goes through the rendezvous node R31, and branches off at the broker node B24. After branching off at the broker node B24, the event information is delivered to the subscriber node S41 through the broker node B26, or delivered to the subscriber node S42 through the broker node B25.

The present event delivery system constructs the delivery route as described in the event delivery system of FIG. 1.

Then, the present event delivery system newly constructs a delivery route from the broker node B23 to the broker node B24 particularly indicated by the dotted line of FIG. 2. The present event delivery system realizes a delivery route that does not go through the rendezvous node R31 by the new delivery route, thereby reducing the load on the rendezvous node R31.

Figure 18:
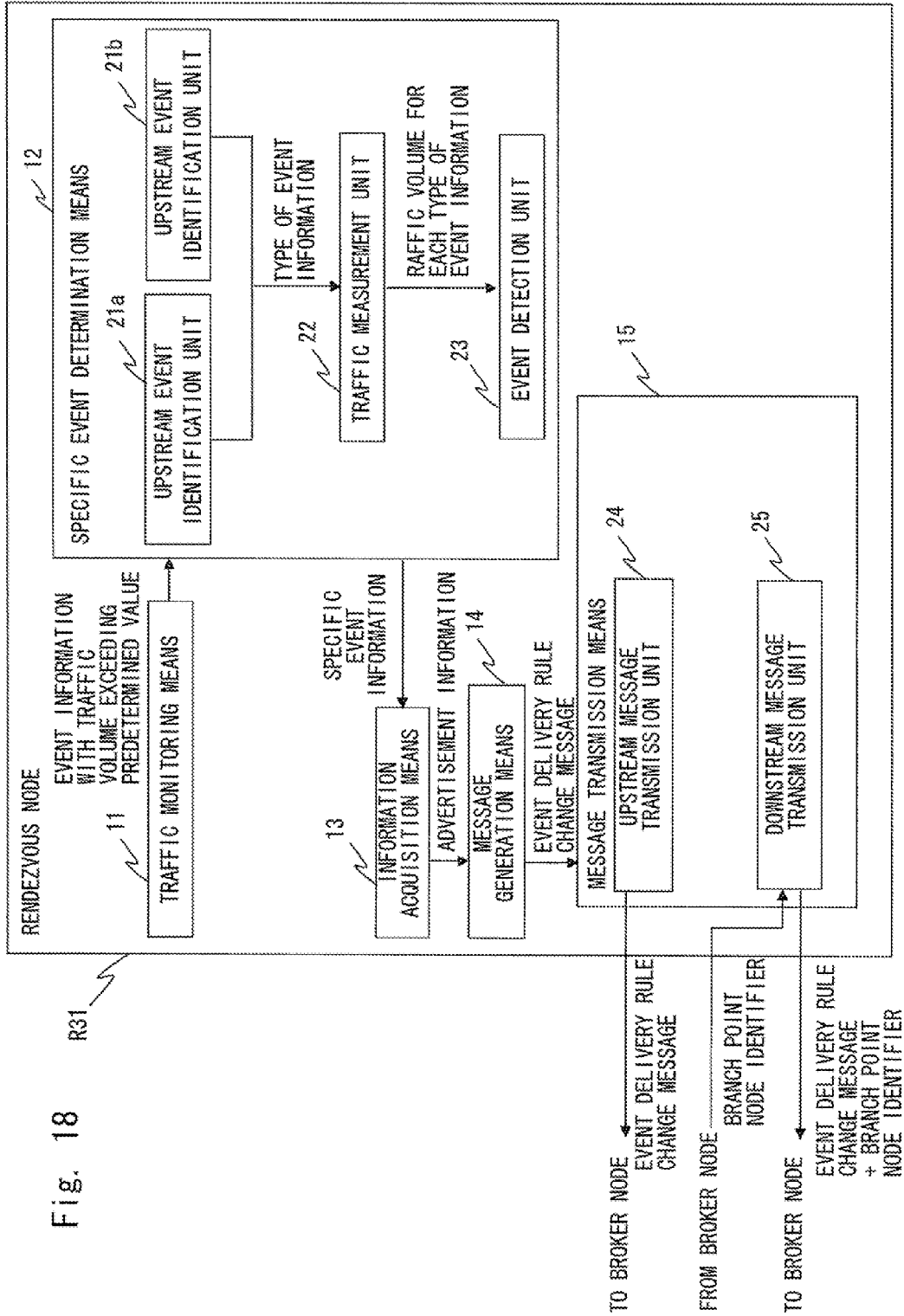
FIG. 18 is a block diagram illustrating a configuration of a rendezvous node according to the present invention.

FIG. 18 is a block diagram illustrating a configuration of the rendezvous node R31. The rendezvous node R31 includes, as a minimum configuration, a traffic monitoring means 11 that monitors the traffic volume of the event information passing through its own node, and a specific event determination means 12 that determines specific event information subject to load distribution from among the event information when the traffic volume monitored by the traffic monitoring means 11 exceeds a predetermined value.

The specific event determination means 12 includes an upper event identification unit 21a that identifies the type of the event information with at least two levels of identification elements from the top of the hierarchy of identification elements of event information, a lower event identification unit 21b that identifies the type of the event information with the lowest level of identification element in the hierarchy of identification elements, a traffic measurement unit 22 that measures the traffic volume for each type of the event information which is identified by the upper event identification unit 21a or the lower event identification unit 21b, and an event detection unit 23 that determines at least one event information in decreasing order of the traffic volume for each type of the event information which is measured by the traffic measurement unit 22 as specific event information.

The rendezvous node R31 may further include an information acquisition means 13 that acquires advertisement information related to the specific event information which is determined by the specific event determination means 12, a message generation means 14 that generates an event delivery route change message containing the advertisement information which is acquired by the information acquisition means 13, and a message transmission means 15 that transmits the event delivery route change message which is generated by the message generation means 14 to the broker nodes (B21 to B26) included in the event delivery system.

The message transmission means 15 includes a downstream message transmission unit 24 that transmits the event delivery route change message which is generated by the message generation means 14 to the broker nodes (B24 to B26) on the subscriber nodes (S41, S42) side, and an upstream message transmission unit 25 that, when the branch point node identifier is notified from at least one of the broker nodes (B24 to B26), adds the branch point node identifier to the event delivery route change message and transmits it to the broker nodes (B21 to B23) on the publisher nodes (P11, P12) side.

The operation of the rendezvous node R31 is described hereinbelow.

The rendezvous node R31 includes a means 1 that stores the advertisement information (a1, a2) respectively transmitted from the publisher nodes (P11, P12). The advertisement information (a1, a2) contains event model information and attribute information.

The rendezvous node R31 includes a means 2 that stores the request information (s1, s2) respectively transmitted from the subscriber nodes (S41, S42). The request information (s1, s2) contains an event type of a requested event, attribute information, and filter condition.

The rendezvous node R31 includes a means 3 that identifies each event information which passes through the rendezvous node R31 in units of event model or event model+ attribute information.

The rendezvous node R31 includes a means 4 that monitors the traffic volume with respect to each event which is identified by the means 3. For example, when focusing attention on given event information, the number of events (event/s) passing through the rendezvous node R31 is treated as the traffic volume.

The rendezvous node R31 includes a means 5 that detects that the traffic volume of given event information exceeds a certain level and determines the event as the specific event information.

The rendezvous node R31 includes a means 6 that generates an upstream event delivery route change message for changing the delivery route of the event information and transmits it to the publisher nodes (P11, P12) side when the excess of the traffic volume is detected by the means 5. Specifically, the upstream event delivery route change message contains identification information of the branch point node that is notified by a means 13, which is described later.

The rendezvous node R31 includes a means 7 that generates a downstream event delivery route change message and transmits it to the subscriber nodes (S41, S42) side when the excess of the traffic volume is detected by the means 5.

Figure 19:
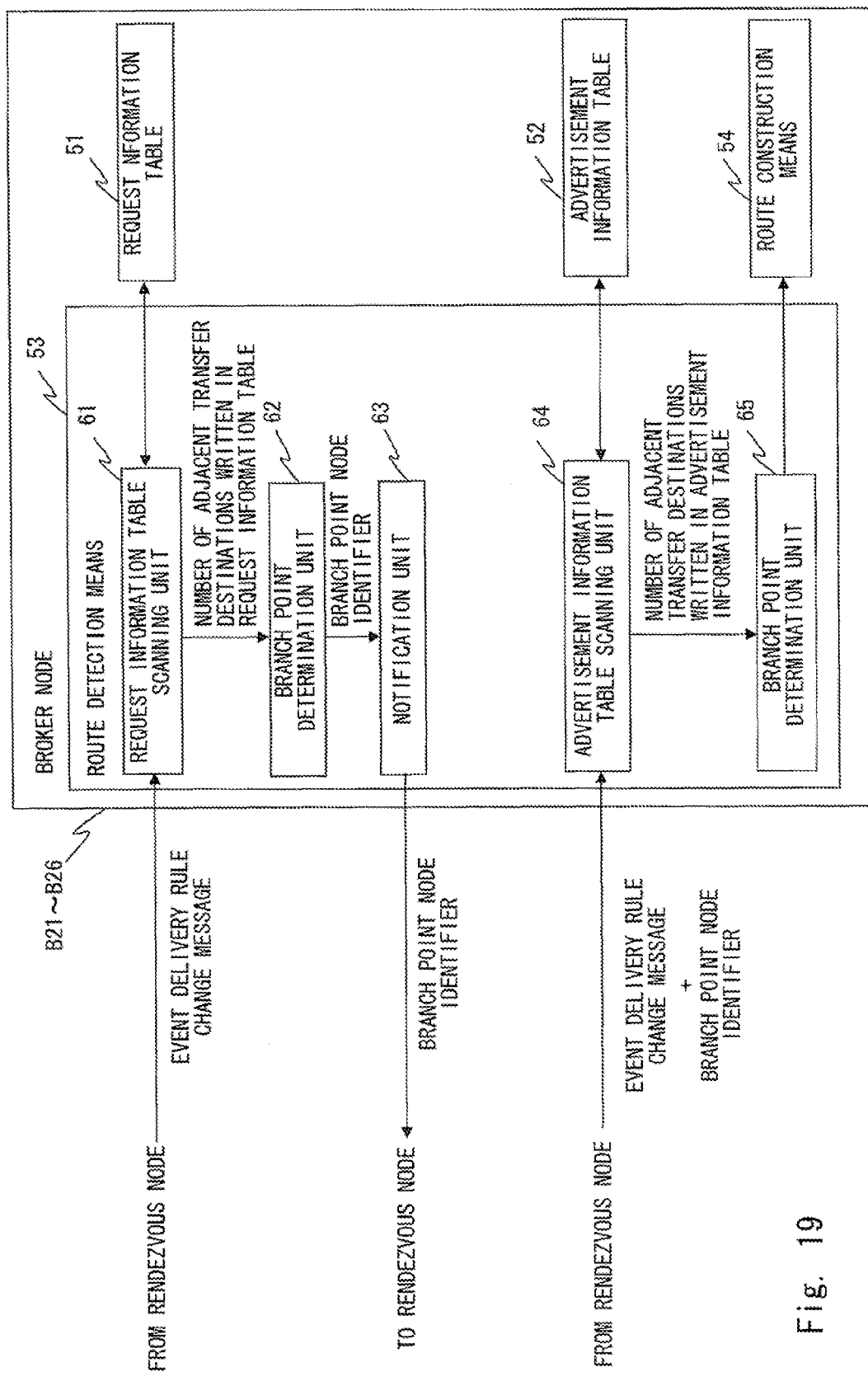
FIG. 19 is a block diagram illustrating a configuration of a broker node according to the present invention.

FIG. 19 is a block diagram illustrating a configuration of the broker nodes (B21 to B26). The broker nodes (B21 to B26) include, as a minimum configuration, a route detection means 53 that detects whether its own node is the aggregation point node or the branch point node for changing the current delivery route of the specific event information subject to load distribution from among the event information, and a route construction means 54 that constructs a new delivery route of the specific event information which goes through the aggregation point node and the branch point node detected by the route detection means 53, bypassing the rendezvous node R31.

The route detection means 53 includes a request information table scanning unit 61 that scans a request information table 51 storing request information requesting the event information issued by the subscriber nodes (S41, S42) upon receiving the event delivery route change message from the rendezvous node R31, a branch point determination unit 62 that determines that its own node is the branch point node when a plurality of adjacent transfer destinations related to the specific event information are registered in the request information table 51 scanned by the request information table scanning unit 61, and a notification unit 63 that notifies the identifier of its own node as the branch point node identifier to the rendezvous node R31 when the branch point determination unit 62 determines that its own node is the branch point node.

Further, the route detection means 53 includes an advertisement information table scanning unit 64 that scans an advertisement information table 52 storing advertisement information advertising the event issued by the publisher nodes (P11, P12) upon receiving the event delivery route change message added with the branch point node identifier from the rendezvous node R31, and an aggregation point determination unit 65 that determines that its own node is the aggregation point node when a plurality of adjacent transfer destinations related to the specific event information are registered in the advertisement information table 52 scanned by the advertisement information table scanning unit 64.

When the aggregation point determination unit 65 determines that its own node is the aggregation point node, the route construction means 54 rewrites the branch point node identifier over the adjacent transfer destination registered in the advertisement information table 52 and thereby constructs a new delivery route.

The operation of the broker nodes (B21 to B26) is described hereinbelow. The broker nodes (B21 to B26) is characterized in further including the following means compared with the broker nodes (B1 to B5) described in FIG. 1.

The broker nodes (B21 to B26) include a means 8 that, upon receiving the advertisement information (a1, a2), stores its transmission source and adjacent transfer destination and the advertisement information into the advertisement information table.

The broker nodes (B21 to B26) include a means 9 that, upon receiving the request information (s1, s2), stores its transmission source and adjacent transfer destination and the request information into the request information table.

The broker nodes (B24 to B26) which are located on the subscriber nodes (S41, S42) side with respect to the rendezvous node R31 include a means 10 that refers to the request information table upon receiving the downstream event delivery route change message.

The broker nodes (B24 to B26) include a means 11 that detects that it is the branch point node like the broker node B25 as a result of referring to the request information table by the means 10. For example, the broker nodes determine that its own node is the branch point node when the content of the downstream event delivery route change message and the content of the request information table (for example, the event type and attribute information of the event) match and further a plurality of adjacent transfer destinations are registered.

The broker nodes (B24 to B26) include a means 12 that terminates the transfer of the downstream event delivery route change message when its own node is the branch point node.

The broker nodes (B24 to B26) include a means 13 that notifies identification information of its own node, such as a node identifier, ID or address, for example, to the rendezvous node R31 when its own node is determined as the branch point node by the means 11.

The broker nodes (B21 to B23) which are located on the publisher nodes (P11, P12) side with respect to the rendezvous node R31 include a means 14 that refers to the advertisement information table upon receiving the upstream event delivery route change information.

The broker nodes (B21 to B23) include a means 15 that detects that it is the aggregation point node like the broker node B23 as a result of referring to the advertisement information table by the means 14. For example, the broker nodes determine that its own node is the aggregation point node when a plurality of broker nodes are registered as the transmission source of the advertisement information table.

The broker nodes (B21 to B23) include a means 16 that terminates the transfer of the upstream event delivery route change message when its own node is the aggregation point node.

The broker nodes (B21 to B23) include a means 17 that newly sets a route to deliver the event to the branch point node which is notified from the rendezvous node R31 when its own node is determined as the aggregation point node by the means 15. Specifically, information of the branch point node is contained in the upstream event delivery route change message, and the broker nodes (B21 to B23) change the adjacent transfer destination of the advertisement information table to the branch point node.

Note that, in this specification, the means 1 is referred to as the information acquisition means 13, the means 3 as the upper event identification unit 21a or the lower event identification unit 21b, the means 4 as the traffic measurement unit 22, the means 5 as the event detection unit 23 and the specific event determination means 12, the means 6 as the upstream message transmission unit 25, the means 7 as the message generation means 14 and the downstream message transmission unit 24, the means 10 as the request information table scanning unit 61, the means 11 as the branch point determination unit 62, the means 13 as the notification unit 63, the means 14 as the advertisement information table scanning unit 64, the means 15 as the aggregation point determination unit 65, and the means 17 as the route construction means 54 in some cases. Further, the means 11 and the means 15 correspond to the route detection means 53. Note that the traffic measurement unit 22 may have a configuration to calculate the traffic volume for each event from data of the traffic volume monitored by the traffic monitoring means 11.

Figure 20:
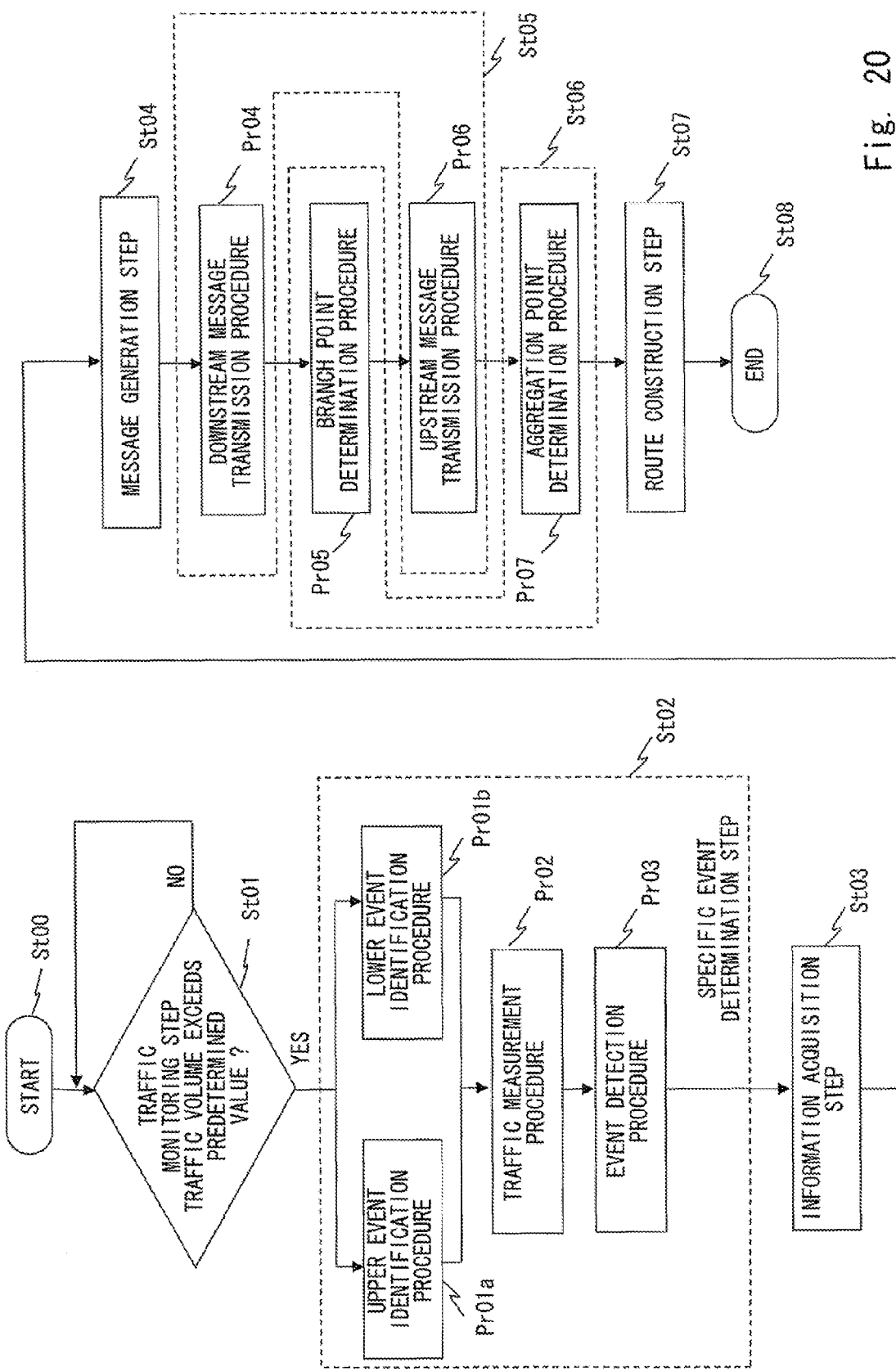
FIG. 20 is a flowchart illustrating an operation of the event delivery system according to the present invention.

FIG. 20 is a flowchart illustrating the operation of the event delivery system according to the exemplary embodiment. In the load distribution method for the event delivery system, a traffic monitoring step St01, a specific event determination step St02, a route detection step St06, and a route construction step St07 are sequentially performed as the minimum steps. In the load distribution method for the event delivery system, after the specific event determination step St02, an information acquisition step St03, a message generation step St04 and a message transmission step St05 may be sequentially performed, and then the route detection step St06 may be performed. Note that, the message transmission step St05 and the route detection step St06 are performed alternately, as described later.

Among them, the traffic monitoring step St01 and the specific event determination step St02 are the minimum steps of the load distribution method which is performed by the rendezvous node R31. In the load distribution method for the rendezvous node R31, after the specific event determination step St02, the information acquisition step St03, the message generation step St04 and the message transmission step St05 may be sequentially performed.

Further, the route detection step St06 and the route construction step St07 are the minimum steps of the delivery route construction method which is performed by the broker nodes (B21 to B26).

Hereinafter, the load distribution method for the event delivery system in which the event delivery system delivers event information by bypassing the rendezvous node, the load distribution method for the rendezvous node, and the delivery route construction method for the broker node are described in further detail with reference to FIG. 2 and FIG. 20. In the traffic monitoring step St01, the traffic monitoring means 11 of the rendezvous node R31 monitors the traffic volume of the event information issued by the publisher nodes (P11, P12) at the rendezvous node R31. Then, when the traffic volume of the rendezvous node R31 exceeds a predetermined value, it proceeds to the specific event determination step St02.

In the specific event determination step St02, specific event information subject to load distribution is determined from among the event information when the traffic volume of the rendezvous node R31 exceeds a predetermined value. In the route detection step St06, the route detection means 53 of the broker nodes (B21 to B26) detects the aggregation point node and the branch point node for changing the current delivery route of the specific event information from among the broker nodes. In the route construction step St07, the route construction means 54 of the broker nodes (B21 to B26) constructs a new delivery route of the specific event information which goes through the aggregation point node and the branch point node, bypassing the rendezvous node R31.

When the event information is composed of identification elements made up of a plurality of hierarchical levels, the specific event information is determined as follows in the specific event determination step St02. In an upper event identification procedure Pr01a, the upper event identification unit 21a included in the specific event determination means 12 identifies the type of the event information with at least two levels of identification elements from the top of the hierarchy of identification elements. Further, in a lower event identification procedure Pr01b, the lower event identification unit 21b included in the specific event determination means 12 may identify the type of event information with the lowest level of identification element in the hierarchy of identification elements.

In a traffic measurement procedure Pr02, the traffic measurement unit 22 included in the specific event determination means 12 measures the traffic volume for each type of the event information which is identified by the upper event identification unit 21a or the lower event identification unit 21b. In an event detection procedure Pr03, the event detection unit 23 included in the specific event determination means 12 determines at least one event information in decreasing order of the traffic volume for each type of the event information as specific event information.

Next, the operation from the specific event determination step St02 to the route construction step St07 is described in detail. In the event delivery system, after the specific event determination step St02, the information acquisition step St03 in which the information acquisition means 13 of the rendezvous node R31 acquires advertisement information related to the specific event information, and the message generation step St04 in which the message generation means 14 of the rendezvous node R31 generates an event delivery route change message containing the advertisement information are performed sequentially.

In the event delivery system, after the message generation step St04, the message transmission step St05 which includes a downstream message transmission procedure Pr04 and an upstream message transmission procedure Pr06, and the route detection step St06 which includes a branch point determination procedure Pr05 and an aggregation point determination procedure Pr07 are performed.

Specifically, after the message generation step St04, in the downstream message transmission procedure Pr04, the rendezvous node R31 transmits the event delivery route change message to the broker nodes (B24 to B26) by the downstream message transmission unit 24 included in the message transmission means 15.

Figure 21:
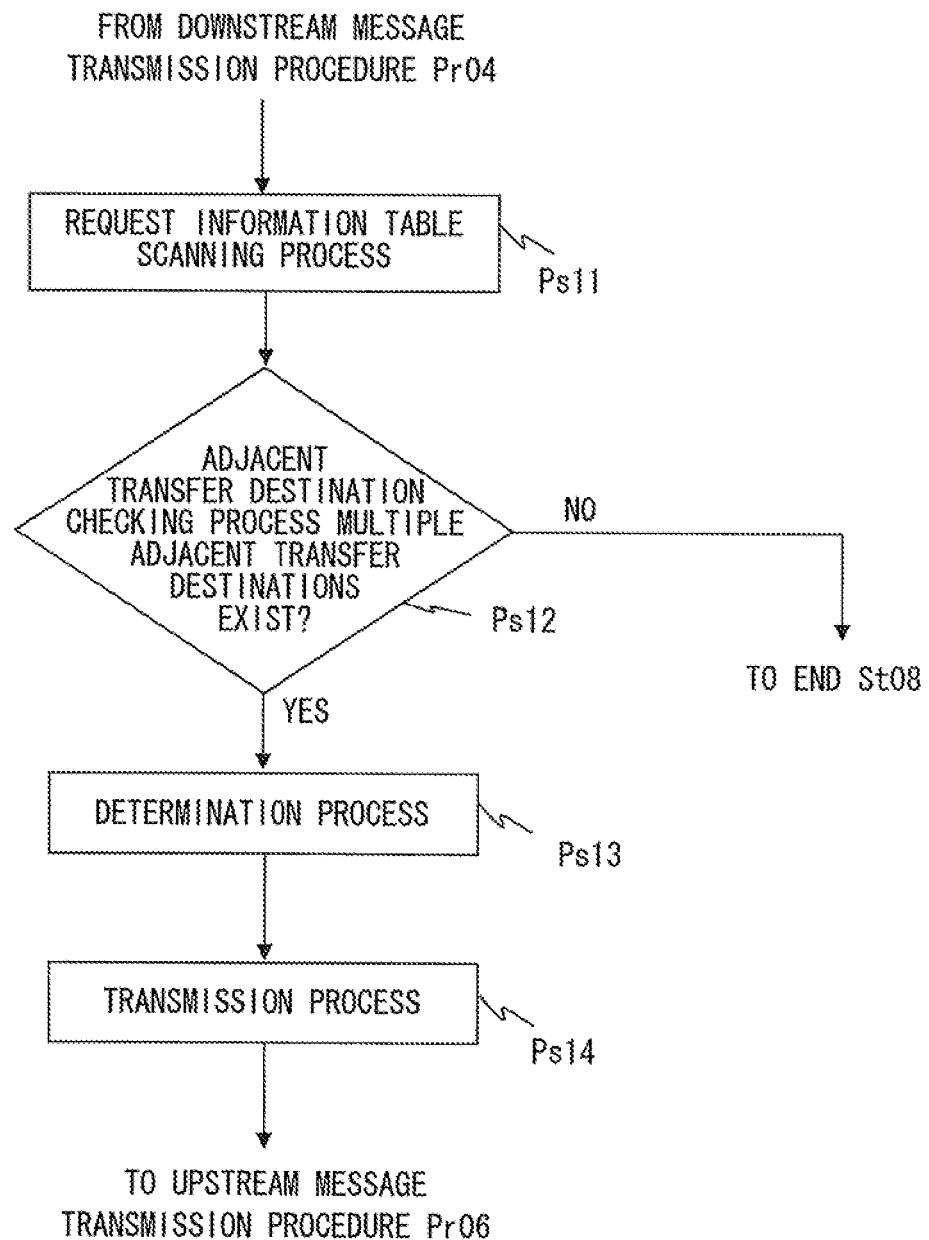
FIG. 21 is a view illustrating a specific procedure of a branch point determination procedure in the event delivery system according to the present invention.

The broker nodes (B24 to B26) perform the branch point determination procedure Pr05 upon receiving the event delivery route change message. FIG. 21 is a view illustrating a specific procedure of the branch point determination procedure Pr05. The broker nodes (B24 to B26) scan the request information table 51 storing request information by the branch point determination unit 62 included in the route detection means 53 in a request information table scanning process Ps11, and check whether a plurality of adjacent transfer destinations related to the specific event information are registered in the request information table 51 in an adjacent transfer destination checking process Ps12. When a plurality of adjacent transfer destinations related to the specific event information are registered in the request information table 51, the broker nodes (B24 to B26) determine that its own node is the branch point node in a determination process Ps13. Further, the broker nodes (B24 to B26) transmit the identifier of its own node to the rendezvous node R31 in a transmission process Ps14.

Then, in the upstream message transmission procedure Pr06, the rendezvous node R31 adds the identifier of the broker node which is determined to be the branch point node as the branch point node identifier to the event delivery route change message and transmits it to the broker nodes (B21 to B23) by the upstream message transmission unit 25 included in the message transmission means 15.

Figure 22:
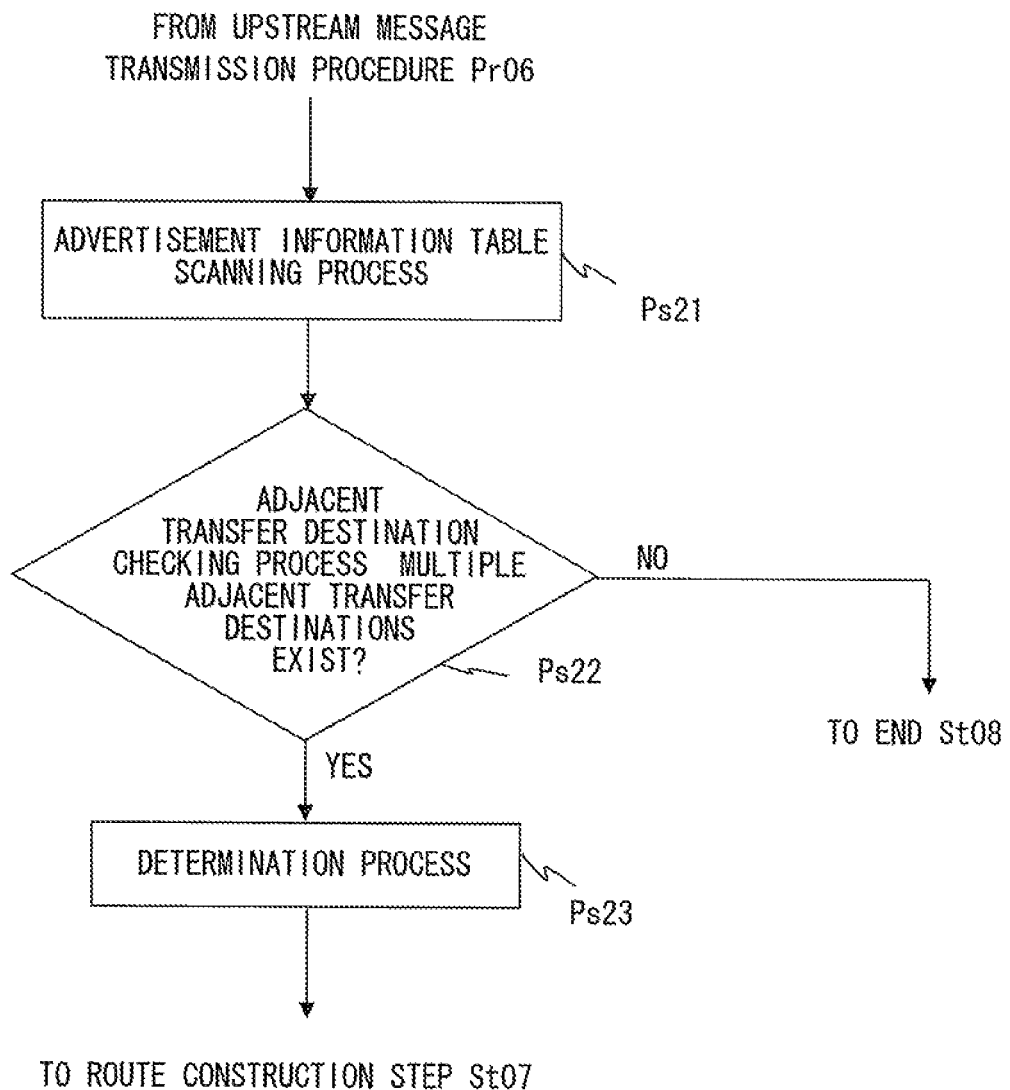
FIG. 22 is a view illustrating a specific procedure of an aggregation point determination procedure in the event delivery system according to the present invention.

The broker nodes (B21 to B23) perform the aggregation point determination procedure Pr07 upon receiving the event delivery route change message added with the branch point node identifier. FIG. 22 is a view illustrating a specific procedure of the aggregation point determination procedure Pr07. The broker nodes (B21 to B23) scan the advertisement information table 52 storing advertisement information by the aggregation point determination unit 65 included in the route detection means 53 in an advertisement information table scanning process Ps21, and check whether a plurality of adjacent transfer destinations related to the specific event information are registered in the advertisement information table 52 in an adjacent transfer destination checking process Ps22. When a plurality of adjacent transfer destinations related to the specific event information are registered in the advertisement information table 52, the broker nodes (B21 to B23) determine that its own node is the aggregation point node in a determination process Ps23.

In the event delivery system, after the aggregation point determination procedure Pr07, the route construction step St07 is performed. Specifically, the broker node serving as the aggregation point node rewrites the branch point node identifier over the adjacent transfer destination registered in the advertisement information table 52 of its own node and thereby constructs a new delivery route.

For example, the load distribution method for the event delivery system, the load distribution method for the rendezvous node, and the delivery route construction method for the broker node may be implemented by being created as computer readable load distribution program and delivery route construction program and executed on a computer. By executing the load distribution program and the delivery route construction program on a computer, the event delivery system can create a novel event delivery route which does not go through the rendezvous node R31.

In the implementation as computer readable load distribution program and delivery route construction program, computer programs may be provided by being recorded on a recording medium or transmitted through the Internet or other transmission media. The storage media include flexible disks, hard disks, magnetic disks, magneto-optical disks, CD-ROM, DVD, ROM cartridges, RAM memory cartridges with battery backup, flash memory cartridges, and nonvolatile RAM cartridges, for example. Further, the communication media include wired communication media such as telephone lines and wireless communication media such as microwave lines, for example.

The overall operation of the exemplary embodiment is described in further detail hereinbelow with reference to flowcharts of FIG. 3 and FIG. 4. In this exemplary embodiment, the explanation is given based on the assumption that the publisher nodes (P11, P12) issue the event information (p1, p2) having the same event type and attribute information.

Figure 3:
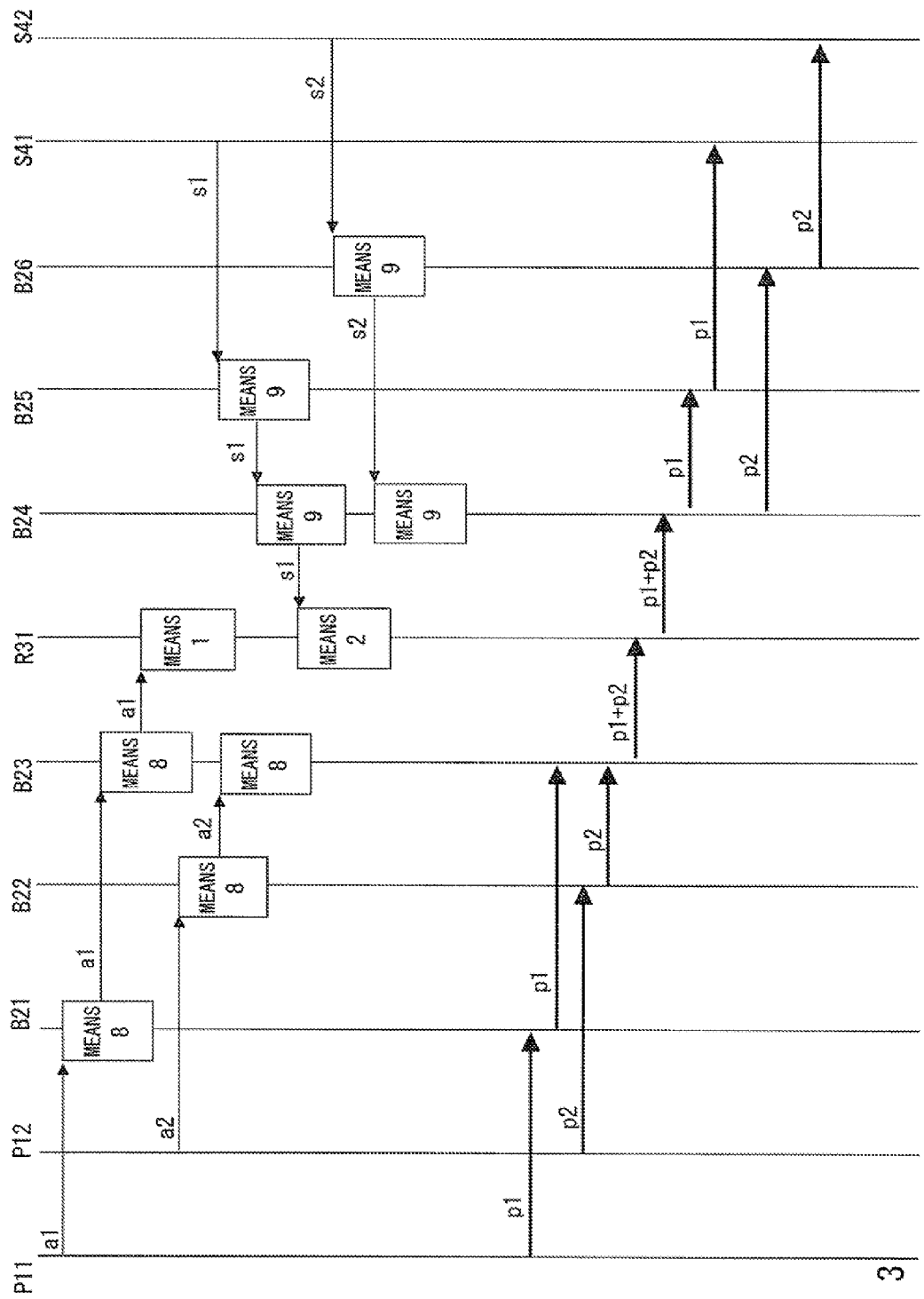
FIG. 3 is a sequence chart illustrating setting of a delivery route in the event delivery system according to the present invention.
Figure 4:
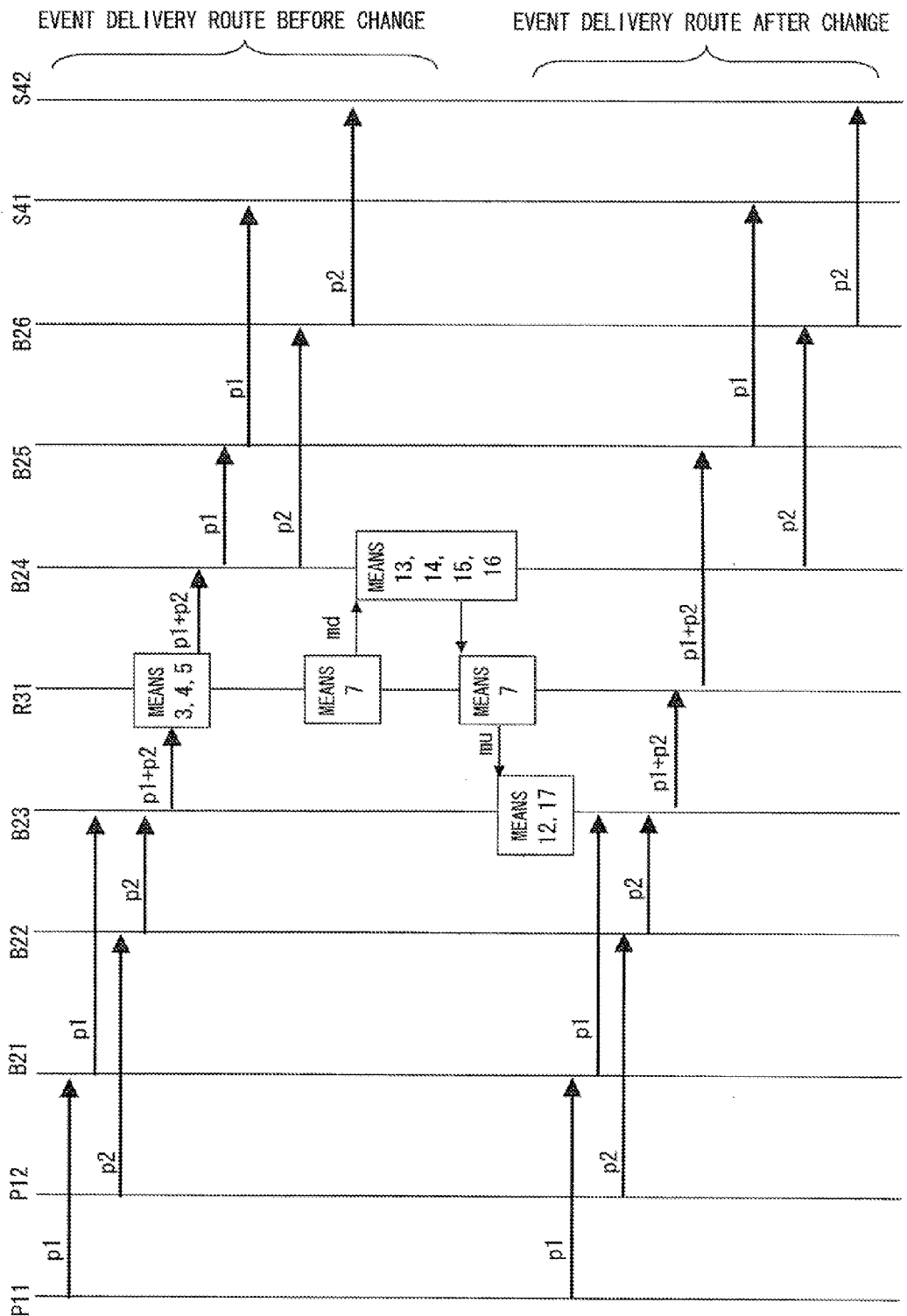
FIG. 4 is a sequence chart illustrating changing of a delivery route in the event delivery system according to the present invention.

In FIG. 3, the publisher node P11 first transmits the advertisement information a1 to the broker node B21, which is an adjacent node, in order to transmit the advertisement information to the rendezvous node R31. The broker node B21 that has received the advertisement information a1 stores the advertisement information a1 by the means 8. Specifically, because its own node is the broker node B21 and the transmission destination is the rendezvous node R31, the information which is stored in the advertisement information table by the means 8 is information whose transmission source is the publisher node P11, whose adjacent transfer destination is the broker node B23, and which is contained in the advertisement information a1. Next, the advertisement information a1 is transferred to the broker node B23 as the adjacent transfer destination.

The broker node B23 processes the advertisement information a1 which is transferred from the broker node B21 in the same manner as described for the broker node B21. Note, however, that because its own node is the broker node B23 and the transmission destination is the rendezvous node R31, the information which is stored in the advertisement information table by the means 8 is information whose transmission source is the broker node B21, whose adjacent transfer destination is the rendezvous node R31, and which is contained in the advertisement information a1. In the above manner, the event delivery route of:

(Publisher node P11)-(Broker node B21)-(Broker node B23)-(Rendezvous node R31)

is constructed using the advertisement information a1.

Next, the construction of the event delivery route from the publisher node P12 to the rendezvous node R31 is described. It is assumed that the publisher node P12 issues the same type of event as the publisher node P11. In FIG. 3, the publisher node P12 transmits the advertisement information a2 to the broker node B22, which is an adjacent node, in order to transmit the advertisement information a2 to the rendezvous node R31. The broker node B22 that has received the advertisement information a2 stores the advertisement information a2 by the means 8. Because its own node is the broker node B22 and the transmission destination is the rendezvous node R31, the information which is stored in the advertisement information table by the means 8 is information whose transmission source is the publisher node P12, whose adjacent transfer destination is the broker node B23, and which is contained in the advertisement information a2. Next, the advertisement information a2 is transferred to the broker node B23 as the adjacent transfer destination.

The broker node B23 processes the advertisement information a2 which is transferred from the broker node B22 in the same manner as described for the broker node B22. Note, however, that because its own node is the broker node B23 and the transmission destination is the rendezvous node R31, the information which is stored in the advertisement information table by the means 8 is information whose transmission source is the broker node B22 and whose adjacent transfer destination is the rendezvous node R31. However, the event delivery route of:

(Publisher node P11)-(Broker node B21)-(Broker node B23)-(Rendezvous node R31)

has been already constructed in the processing of the advertisement information a1. Therefore, the processing of the advertisement information a2 only adds the broker node B22 to the transmission source information of the existing setting. In the above manner, the event delivery route of:

(Publisher node P12)-(Broker node B22)-(Broker node B23)-(Rendezvous node R31)

is constructed using the advertisement information a2.

FIG. 5 shows the advertisement information table of the broker node B23 which is constructed by the means 8. The advertisement information (Adv11, Adv12) is the advertisement information a1 in the above description, and the advertisement information (Adv21, Adv22) is the advertisement information a2 in the above description. Each advertisement information is classified by the event type name and further segmentalized by the element and the attribute information contained in the advertisement information. Then, the transmission source and the transmission destination of each advertisement information are written in each field. For example, it is written that the transmission source of the advertisement information Adv11 is the broker node B21, and the adjacent transfer destination is the rendezvous node R31.

Next, the processing on the subscriber side is described. In FIG. 3, the subscriber node S41 first transmits the request information s1 to the broker node B25, which is an adjacent node, in order to transmit the request information s1 to the rendezvous node R31. The broker node B25 that has received the request information s1 stores the request information s1 using the means 9. Because its own node is the broker node B25 and the transmission destination is the rendezvous node R31, the information which is stored in the request information table by the means 9 is information whose transmission source is the subscriber node S41, whose adjacent transfer destination is the broker node B24, and which is contained in the request information s1. Next, the request information s1 is transferred to the broker node B24 as the adjacent transfer destination.

The broker node B24 processes the request information s1 which is transferred from the broker node B25 in the same manner as described for the broker node B25. Note, however, that because its own node is the broker node B24 and the transmission destination is the rendezvous node R31, the information which is stored in the request information table by the means 9 is information whose transmission source is the broker node B25, whose adjacent transfer destination is the rendezvous node R31, and which is contained in the request information s1. In the above manner, the route of:

(Subscriber node S41-(Broker node B25)-(Broker node B24)-(Rendezvous node R31)

is constructed using the request information. In the process of actually delivering the event, the event delivery is performed in the reverse direction through the route of the request information s1.

FIG. 6 shows the request information table of the broker node B24 which is constructed in the means 9. The request information (Sub11, Sub12) is the request information s1 in the above description, and the request information (Sub21, Sub22) is the request information s2 in the above description. Each request information is classified by the event type name and further segmentalized by the element and the attribute information contained in the request information. Then, the transmission source and the transmission destination of each request information are written in each field. For example, it is written that the transmission source of the request information Sub11 is the broker node B25, and the adjacent transfer destination is the rendezvous node R31.

The reconstruction of the event delivery route according to the exemplary embodiment is described hereinafter. It is assumed that event delivery is being performed through the event delivery route which is already constructed. The rendezvous node R31 identifies the event information passing through its own node by the means 3 and further monitors its traffic volume by the means 4. When the traffic volume of given event information becomes a certain level or more, the rendezvous node R31 starts the process of changing the event delivery route by the means 5 as shown in FIG. 4. First, the rendezvous node R31 generates and transmits a downstream event delivery route change message md to the broker node B24 by the means 7.

Next, the broker node B24 refers to the request information stored in itself by the means 10 and determines whether its own node is the branch point node or not by the means 11. Because the broker node B24 is the branch point node in the example of FIG. 2, the broker node B24 terminates the downstream event delivery route change message and by the means 12. Then, the broker node B24 notifies identification information of its own node to the rendezvous node R31 by the means 13. In the above process, the rendezvous node R31 specifies the delivery route change point on the subscriber node side.

Then, the rendezvous node R31 specifies the change point of the event delivery route on the publisher node side. The rendezvous node R31 first generates and transmits an upstream event delivery route change message mu to the broker node B23 by the means 6.

Next, the broker node B23 refers to the advertisement information stored in itself by the means 14 and determines whether its own node is the aggregation point node or not by the means 15. Because the broker node B23 is the aggregation point node in the example of FIG. 2, the broker node B23 terminates the transfer of the upstream event delivery route change message mu by the means 16. Then, the broker node B23 changes the adjacent transfer destination of the advertisement information table from the rendezvous node R31 to the broker node B24 by the means 17.

In the above process, the event delivery route before change, that is the delivery route which goes through the rendezvous node R31, can be changed to the delivery route which is transferred from the broker node B23 to the broker node B24 indicated by the dotted line of FIG. 2.

Figure 7:
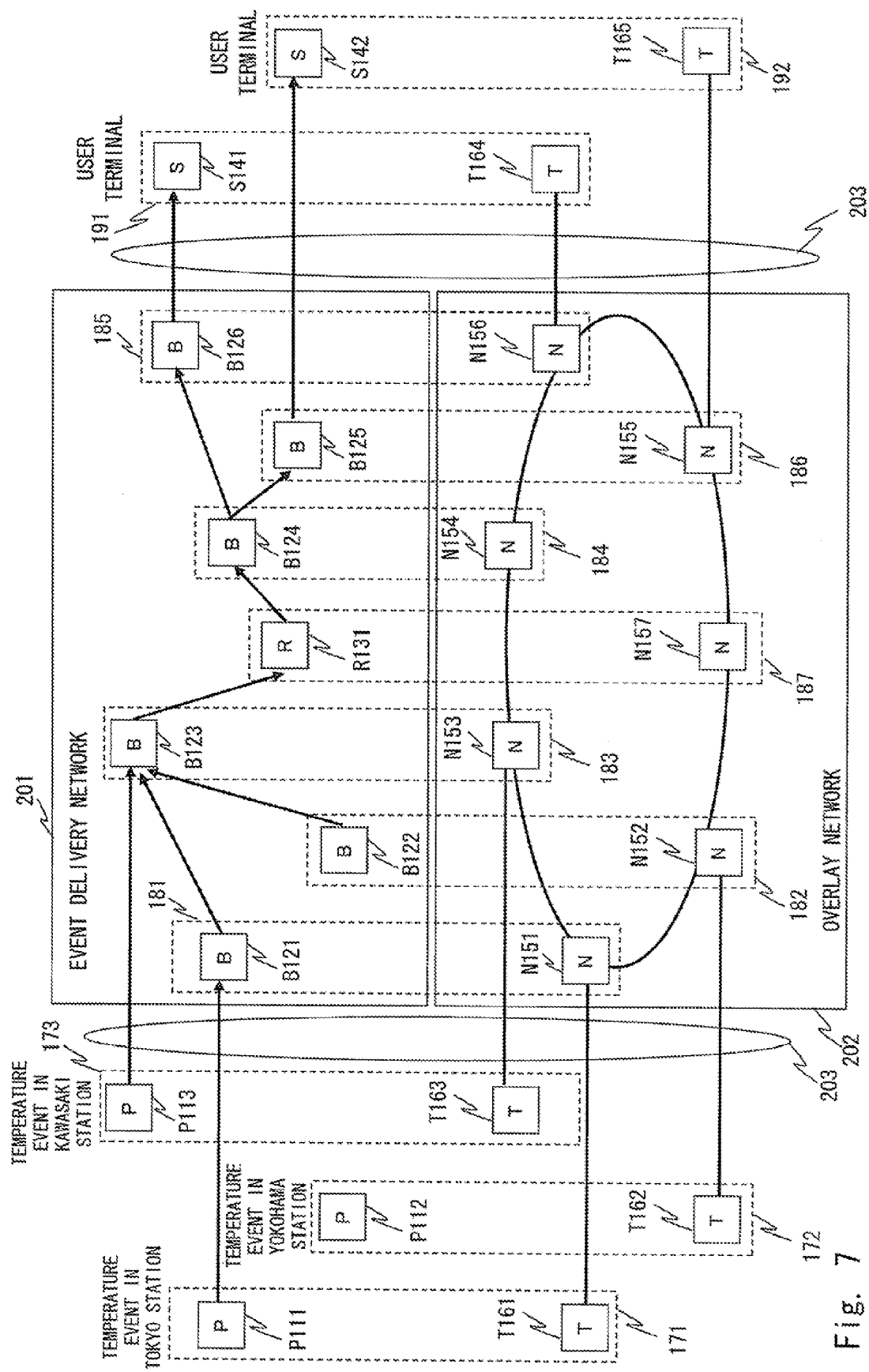
FIG. 7 is a schematic block diagram illustrating an example of the event delivery system according to the present invention.

A specific operation example is described hereinbelow. FIG. 7 is a schematic block diagram of the event delivery system in which an event delivery network 201 according to the present invention is constructed on an overlay network 202 using DHT (Distributed Hash Table). In FIG. 7, broker nodes (B121 to B126) operate as application programs on respective overlay nodes (N151 to N156). A rendezvous node R131 operates as an application program on an overlay node N157.

Publisher nodes (P111 to P113) are applications that operate on terminals (171 to 173) respectively connected to Internet 203. The terminals (171 to 173, 191, 192) are PCs (Personal Computers), Internet-connectable mobile phones, or sensor terminals, for example. In FIG. 7, the publisher node P111 connects to the broker node B121 by use of TCP/IP (Transmission Control Protocol/Internet Protocol), for example, and the publisher node P112 also connects to the broker node B122 in the same manner. The use of TCP/IP is merely an example, and UDP/IP (User Datagram Protocol/Internet Protocol) or HTTP (HyperText Transfer Protocol) may be used instead. Such communication clients are illustrated as communication clients (T161 to T165) in FIG. 7. Then, the publisher nodes (P111, P112) transmit the event information as shown in FIG. 8 by use of a communication protocol such as TCP/IP or HTTP.

The event information is described next. In this exemplary embodiment, each event information is represented by a plurality of element information or attribute information assigned to element information. Then, one event information is generated by assigning data such as a numerical value, a character and a character string to the element information or the attribute information contained in the event information. For example, the event information related to temperature can be represented by XML (eXtensible Markup Language) format. This example shows the event information at a temperature of 20 degrees or above. In this example, the event type name is represented by (Name="TemperatureMoreThan20") as the attribute information. This name is a global unique in the system according to the present invention. Next, as the detailed attribute information of the event type, Tokyo Station which is place information and GPS information which indicates an actual observation point are defined. The GPS information is further detailed into latitude and longitude information and represented like 35 degrees north latitude and 139 degrees east longitude. Further, the observed event information is represented as "Notification" element, and 21 degrees is shown in this example.

The generation of the event information occurs periodically or upon satisfaction of certain conditions. Thus, the temperature information is issued as the event information at every second in some cases, and the event information is generated at every second in the state at a temperature of 20 degrees or above while the event information is not generated at a lower temperature in other cases. In the example of FIG. 8, the event name of "TemperatureMoreThan20" is used to indicate that the event occurs when the temperature is more than 20 degrees.

The publisher nodes (P111, P112, P113) advertise that such event information is available by the advertisement information as shown in FIG. 9. The advertisement information issued by the publisher node P111 is held by the broker node B121, the broker node B123 and the rendezvous node R131. Further, the advertisement information issued by the publisher node P112 is held by the broker node B122, the broker node B123 and the rendezvous node R131.

On the other hand, subscriber nodes (S141, S142) that desire to receive such event information makes registration for reception by the request information as shown in FIG. 10. The request information issued by the subscriber node S141 is held by the broker node B126, the broker node B124 and the rendezvous node R131. Further, the request information issued by the subscriber node S142 is held by the broker node B125, the broker node B124 and the rendezvous node R131. FIG. 10 shows the request information using XPath (XML Path Language) which is issued by the publisher node P111. This example shows the registration for reception of data in which the event name is "TemperatureMoreThan20", the place is Tokyo Station, and which is observed at a point where the ID of the GPS location is 0001.

Hereinafter, routing of an advertisement message containing advertisement information and a request message containing request information and routing of an event message containing event information which are performed on the overlay network 202 are described briefly. The overlay network 202 is built by technology such as Pastry or Chord, for example. In the overlay network 202, each node has a unique ID (node ID), and each node is identified based on the node ID. The message routing is performed using the node ID. It is assumed in this exemplary embodiment that the ID length of the node ID is 128 bits.

For the routing of the advertisement message and the request message, the node ID as the transmission destination is necessary. The node ID is obtained by hashing the event name (refer to Non Patent Literature 1, for example). If the length of the hash value is 128 bits, the event name is converted into data of 128-bit length. Then, the data ID of 128-bit length is used as transmission destination information of the advertisement message and the request message handled in the overlay network 202.

For example, when the publisher node P111 intends to transmit the advertisement information to the broker node B121, the broker node B121 refers to the event type element (EventType), hashes the attribute information (Name="TemperatureMoreThan20") written therein, and converts it into the data ID of 128-bit length. Then, the broker node B121 uses the data ID as the transmission destination information of the advertisement information of the advertisement information on the overlay network. On the overlay network, the advertisement information is routed to an overlay node having a node ID which numerically matches the data ID of 128-bit length or an overlay node having a node ID which is numerically close thereto. Then, a broker node operating on the overlay node which the advertisement information reaches, which is the overlay node N157 in FIG. 7, is set (assigned) as the rendezvous node R131. More specifically, the advertisement information transmitted by the broker node B121 is routed through the route of:

(Broker node B121/Overlay node N151)-(Broker node B123/Overlay node N153)-(Rendezvous node R131/Overlay node N157).

On the other hand, the transfer of the request information is performed in the same manner. In FIG. 7, the subscriber node S141 first generates the request information and transfers it to the broker node B126. Next, the broker node B126 refers to each element of the event type (EventType), hashes the attribute information (Name="TemperatureMoreThan20") written therein, and converts it into the data ID of 128-bit length. Then, the broker node B126 uses the data ID as the transmission destination information of the request information on the overlay network. On the overlay network, the request information is routed to an overlay node having a node ID which numerically matches the data ID of 128-bit length or an overlay node having a node ID which is numerically close thereto. Because the same event name is hashed, the same ID is obtained, and, as a result, the request information is routed to the rendezvous node R131/N157.

The routing of an event message containing the event information shown in FIG. 8 which is issued from the publisher node P111 or the publisher node P112 is also performed in the same manner.

The load distribution for the rendezvous node is described hereinbelow. FIG. 7 shows the model in which a plurality of publisher nodes (P111, P112, P113) issue the event information of the same event name. Thus, the publisher nodes (P111, P112, P113) use the same event name "TemperatureMoreThan20". As a result, the event information issued by those terminals are delivered to the subscriber node (S141 or S142) through the same rendezvous node R131. If a large number of such publishers exist, the event traffic passing through the rendezvous node R131 increases, which can cause heavy load to be placed on the rendezvous node R131.

In view of the above, the rendezvous node R131 includes a traffic monitoring means that monitors the traffic of the event information (for example, the number of events passing through the rendezvous node R131). Further, the rendezvous node R131 includes a specific event determination means that, during heavy load conditions, specifies the event information (specific event information) which causes the heavy load. Further, the rendezvous node R131 includes a route detection means that finds out another delivery route which can route the specific event information, and a route construction means that newly constructs the found delivery route and routes the specific event information. The event delivery system of FIG. 7 reduces the load on the rendezvous node R131 by routing the specific event information through a new delivery route which does not go through the rendezvous node R131 in the above manner.

The specific event information subject to the load distribution is specified by the specific event determination means as follows. It is assumed that the event information is composed of identification elements made up of a plurality of hierarchical levels. The specific event determination means includes an upper event identification unit that identifies the type of the event information with at least two levels of identification elements from the top of the hierarchy of identification elements, a traffic measurement unit that measures the traffic volume for each type of the event information which is identified by the upper event identification unit, and an event detection unit that determines at least one event information in decreasing order of the traffic volume for each type of the event information which is measured by the traffic measurement unit as specific event information.

Each event information is managed in tree format as shown in FIG. 13, for example. The first level is a hierarchical level in which the attribute information is (Name="TemperatureMoreThan20") and which monitors the total traffic volume of the event type. Thus, the traffic volume at the first level is the total traffic volume of the event information whose attribute information is (Name="TemperatureMoreThan20"), which is the total sum of the traffic volumes of three event information at the second level. The second level is a hierarchical level that is distinguished by element information such as Place or GlobalPosition, which is detailed element information. Tokyo Station, Yokohama Station and Kawasaki Station are taken as examples. The third level is a hierarchical level that is distinguished by element information, which is further detailed from the second level. For example, it is a hierarchical level that is distinguished by the value of the data ID which is the attribute information of GlobalPosition, or the element information of AreaOfLatitude, DegreeOfLatitude, AreaOfLongitude, DegreeOfLongitude in Tokyo Station. The numerical value indicates the traffic volume of the event information that is distinguished by element information in each hierarchical level.

The rendezvous node R131 distinguishes the event information based on each element information by the upper event identification unit. When the traffic volume of the event information distinguished by the element information at the first level becomes a certain level or more, the rendezvous node R131 starts a process for the load distribution. The rendezvous node R131 scans the traffic volume of the event information that is distinguished by the element information at the second level by the traffic measurement unit and specifies the event information with the maximum traffic by the event detection unit. In the case of FIG. 13, the traffic volume of the temperature event information in Yokohama Station is the maximum, and it is the specific event information subject to the load distribution.

Next, the information acquisition means of the rendezvous node R131 acquires advertisement information related to the specific event information which is determined by the specific event determination means. Then, the message generation means of the rendezvous node R131 generates a downstream event delivery route change message containing the advertisement information which is acquired by the information acquisition means. Further, the downstream message transmission means of the rendezvous node R131 transmits it to the broker node on the subscriber node side.

Specifically, the rendezvous node R131 generates a downstream event delivery route change message for the specific event information and transmits it to the broker node B124. In the downstream event delivery route change message, information for specifying the change point of the delivery route is contained. Specifically, in the case of FIG. 13, because the temperature event in Yokohama Station is subject to the load distribution, the attribute information up to the second level is contained as shown in FIG. 14.

The request information table scanning unit of the broker node B124 scans the request information table storing request information upon receiving the downstream event delivery route change message from the rendezvous node R131. Next, the branch point determination unit of the broker node B124 determines that its own node is the branch point node when a plurality of adjacent transfer destinations related to the specific event information are registered in the request information table which is scanned by the request information table scanning unit. Further, the notification unit of the broker node B124 notifies the identifier of its own node as the branch point node identifier to the rendezvous node R131 when the branch point determination unit determines that its own node is the branch point node.

Specifically, the broker node B124 terminates the transfer of the downstream event delivery route change message when its own node is the branch point node of the specific event information. Whether it is the branch point node or not is determined by the broker node B124 based on the presence or absence of a plurality of adjacent transfer destinations by referring to the request information table shown in FIG. 12. The broker node B124 determines that its own node is the branch point node when &plurality of adjacent transfer destinations exist. The broker node B124/the overlay node N154 in FIG. 7 corresponds to the branch point node.

The broker node B124/the overlay node N154 which has determined that its own node is the branch point node notifies a response message containing the node ID of the overlay node N154 as shown in FIG. 15, for example, to the rendezvous node R131.

When the branch point node identifier is notified from the broker node B124, the upstream message transmission means of the rendezvous node R131 creates an upstream event delivery route change message by adding the branch point node identifier to the downstream event delivery route change message and transmits it to the broker node on the publisher node side.

Specifically, the rendezvous node R131 creates the upstream event delivery route change message and transmits it to the broker node B123. In the upstream event delivery route change message, information for identifying the event information subject to the load distribution, which is the event type (Name="TemperatureMoreThan20") and the attribute information (Place="YokohamaStation"), and information of the route change destination, which is the overlay node N154, is contained as shown in FIG. 16, for example.

The advertisement information table scanning unit of the broker node B123 scans the advertisement information table storing advertisement information upon receiving the upstream event delivery route change message from the rendezvous node R131. Next, the aggregation point determination unit of the broker node B123 determines that its own node is the aggregation point node when a plurality of adjacent transfer destinations related to the specific event information are registered in the advertisement information table which is scanned by the advertisement information table scanning unit.

As shown in FIG. 7, the broker node B123 is the aggregation point node of the specific event information. Thus, the broker node B123 terminates the upstream event delivery route change message. Whether it is the aggregation point node or not is determined by the broker node B123 based on the presence or absence of a plurality of adjacent transfer destinations by referring to the routing table shown in FIG. 11. The broker node B123 determines that its own node is the aggregation point node when a plurality of adjacent transfer destinations exist. The broker node B123/the overlay node N153 in FIG. 7 corresponds to the aggregation point node.

When the aggregation point determination unit determines that its own node is the aggregation point node, the route construction means of the broker node B123 rewrites the branch point node identifier over the adjacent transfer destination registered in the advertisement information table and thereby constructs a new delivery route.

Specifically, the broker node B123/the overlay node N153 updates the advertisement information table held by itself. Specifically, the adjacent transfer destination of the advertisement information table is the rendezvous node R131 before change, and the broker node B124 after change. As a result, the event information transmitted from the publisher nodes (P111, P112) is delivered through the route of:

(Broker node B123)-(Broker node B124), bypassing the rendezvous node R131. Consequently, the load on the rendezvous node R131 shown in FIG. 13 is reduced from 245 to 85.

In the exemplary embodiment described above, the event delivery system in which the load distribution is performed for one event information as the specific event information is described. However, in the present event delivery system, the load distribution may be performed for a plurality of event information by sequentially repeating the process until a certain level of load reduction is achieved in the rendezvous node R31. Further, although only the event information with the maximum traffic volume is subject to the load distribution in one process in the above-described exemplary embodiment, it is not limited thereto. In the present event delivery system, a plurality of event information with the maximum, second and third traffic volumes, for example, may be subject to the load distribution, and the process may be performed simultaneously in parallel. The load distribution processes of the respective event information have a sparse relationship to each other, and they are not necessarily performed sequentially.

Further, there is another method of finding specific event information. Specifically, the specific event determination means includes a lower event identification unit that identifies the type of the event information with the lowest level of identification element in the hierarchy of identification elements, a traffic measurement unit that measures the traffic volume for each type of the event information which is identified by the lower event identification unit, and an event detection unit that determines at least one event information in decreasing order of the traffic volume for each type of the event information which is measured by the traffic measurement unit as specific event information.

For example, the lower event identification unit may make classification with the traffic volume based on the attribute information of each detailed event information. In FIG. 13, the traffic measurement unit checks the traffic volume of each event information of the attribute information (GlobalPositionID) written in the lowest rank which is identified by the lower event identification unit. Then, the event detection unit determines the event information with the maximum traffic volume as the specific event information. After that, the route construction means changes the delivery route of the specific event information to a new delivery route which bypasses the rendezvous node R131, and the load distribution process ends. For example, if the rendezvous node R131 uses the downstream event delivery route change message of FIG. 17 and determines the temperature event with GlobalPositionID="0001" in Yokohama Station as the specific event information by the specific event determination means, the load on the rendezvous node R131 is reduced from 245 to 145.

If the further load distribution is necessary in the present event delivery system, the load on the rendezvous node R131 can be further reduced by repeating the process and sequentially performing the load distribution for the event information sorted into the second and third ranks. The respective load distribution processes have a sparse relationship to each other, and they are not necessarily performed sequentially. For example, in the case of performing the load distribution for three event information in the present event delivery system, the process may be repeatedly executed three times in sequence or may be performed in parallel.

It should be noted that the present invention is not limited to the above-described exemplary embodiments and may be varied in many ways without departing from the scope of the invention. Various changes and modifications as known to those skilled in the art may be made in form and details of the present invention within the scope of the present invention.

This application is based upon and claims the benefit of priority from Japanese patent application No. 2009-032599, filed on Feb. 16, 2009, the disclosure of which is incorporated herein in its entirety by reference.

INDUSTRIAL APPLICABILITY

According to the present invention, a variety of event information may be used in various applications by incorporating the publisher function into various kinds of sensors and incorporating the subscriber function into an application using event information detected by the sensor, for example, and establishing them on the event delivery network of the present invention. Even when the event traffic from the sensor increases and the load on the rendezvous node becomes heavier, the load can be distributed according to the present invention.

REFERENCES SIGNS LIST

P1, P2, P11, P12, P111, P112, P113: PUBLISHER NODE
B1 to B5, B21 to B26, B121 to B126: BROKER NODE
R, R31, R131: RENDEZVOUS NODE
S1, S2, S41, S42, S141, S142: SUBSCRIBER NODE
11: TRAFFIC MONITORING MEANS
12: SPECIFIC EVENT DETERMINATION MEANS
13: INFORMATION ACQUISITION MEANS
14: MESSAGE GENERATION MEANS
15: MESSAGE TRANSMISSION MEANS
21A: UPPER EVENT IDENTIFICATION UNIT
21B: LOWER EVENT IDENTIFICATION UNIT
22: TRAFFIC MEASUREMENT UNIT
23: EVENT DETECTION UNIT
24: DOWNSTREAM MESSAGE TRANSMISSION UNIT
25: UPSTREAM MESSAGE TRANSMISSION UNIT
51: REQUEST INFORMATION TABLE
52: ADVERTISEMENT INFORMATION TABLE
53: ROUTE DETECTION MEANS
54: ROUTE CONSTRUCTION MEANS
61: REQUEST INFORMATION TABLE SCANNING UNIT
62: BRANCH POINT DETERMINATION UNIT
63: NOTIFICATION UNIT
64: ADVERTISEMENT INFORMATION TABLE SCANNING UNIT
65: AGGREGATION POINT DETERMINATION UNIT
St00: START STEP

St01: TRAFFIC MONITORING STEP
St02: SPECIFIC EVENT DETERMINATION STEP
St03: INFORMATION ACQUISITION STEP
St04: MESSAGE GENERATION STEP
St05: MESSAGE TRANSMISSION STEP
St06: ROUTE DETECTION STEP
St07: ROUTE CONSTRUCTION STEP
St08: END STEP
Pr01*a*: UPPER EVENT IDENTIFICATION PROCEDURE
Pr01*b*: LOWER EVENT IDENTIFICATION PROCEDURE
Pr02: TRAFFIC MEASUREMENT PROCEDURE
Pr03: EVENT DETECTION PROCEDURE
Pr04: DOWNSTREAM MESSAGE TRANSMISSION PROCEDURE
Pr05: BRANCH POINT DETERMINATION PROCEDURE
Pr06: UPSTREAM MESSAGE TRANSMISSION PROCEDURE
Pr07: AGGREGATION POINT DETERMINATION PROCEDURE
Ps11: REQUEST INFORMATION TABLE SCANNING PROCESS
Ps12: ADJACENT TRANSFER DESTINATION CHECKING PROCESS
Ps13: DETERMINATION PROCESS
Ps14: TRANSMISSION PROCESS
Ps21: ADVERTISEMENT INFORMATION TABLE SCANNING PROCESS
Ps22: ADJACENT TRANSFER DESTINATION CHECKING PROCESS
Ps23: DETERMINATION PROCESS
N151 to N156: OVERLAY NODE
T161 to T165: COMMUNICATION CLIENT
171 to 173, 191, 192: TERMINAL
181 to 187: PHYSICAL NODE
201: EVENT DELIVERY NETWORK
202: OVERLAY NETWORK
203: INTERNET
Rt1, Rt2, Rt3: ROUTE
p1, p2: EVENT INFORMATION
a1, a2: ADVERTISEMENT INFORMATION
s1, s2: REQUEST INFORMATION

The invention claimed is:

1. An event delivery system comprising:
a publisher node that issues event information containing a content of a generated event and advertisement information advertising the event;
a subscriber node that issues request information for receiving event information of a desired event among the event;
a rendezvous node that makes information management related to the event; and
a broker node that transfers the event information and the advertisement information issued by the publisher node, and the request information issued by the subscriber node, wherein
the rendezvous node includes
a traffic monitoring unit that monitors a traffic volume of the event information issued by the publisher node, and
a specific event determination unit that determines specific event information subject to load distribution from among the event information when the traffic volume monitored by the traffic monitoring unit exceeds a predetermined value, and
the broker node includes
a route detection unit that detects whether the broker node is an aggregation point node or a branch point node for changing a current delivery route of the specific event information, and
a route construction unit that constructs a new delivery route of the specific event information going through the aggregation point node and the branch point node detected by the route detection unit, bypassing the rendezvous node.

2. The event delivery system according to claim 1, wherein the event information is composed of identification elements made up of a plurality of hierarchical levels, and the specific event determination unit of the rendezvous node includes
an upper event identification unit that identifies a type of the event information with at least two levels of identification elements from a top of the hierarchy of the identification elements,
a traffic measurement unit that measures the traffic volume for each type of the event information identified by the upper event identification unit, and
an event detection unit that determines at least one event information in decreasing order of the traffic volume for each type of the event information measured by the traffic measurement unit as the specific event information.

3. The event delivery system according to claim 1, wherein the event information is composed of identification elements made up of a plurality of hierarchical levels, and the specific event determination unit of the rendezvous node includes
a lower event identification unit that identifies a type of the event information with a lowest level of identification element in the hierarchy of identification elements,
a traffic measurement unit that measures the traffic volume for each type of the event information identified by the lower event identification unit, and
an event detection unit that determines at least one event information in decreasing order of the traffic volume for each type of the event information measured by the traffic measurement unit as the specific event information.

4. The event delivery system according to claim 1, wherein the rendezvous node further includes
an information acquisition unit that acquires the advertisement information related to the specific event information determined by the specific event determination unit,
a message generation unit that generates an event delivery route change message containing the advertisement information acquired by the information acquisition unit, and
a message transmission unit including a downstream message transmission unit that transmits the event delivery route change message generated by the message generation unit to the broker node on the subscriber node side.

5. The event delivery system according to claim 4, wherein the route detection unit of the broker node includes
a request information table scanning unit that scans a request information table storing the request information upon receiving the event delivery route change message from the rendezvous node,
a branch point determination unit that determines that the broker node is the branch point node when a plurality of adjacent transfer destinations related to the specific event information are registered in the request information table scanned by the request information table scanning unit, and
a notification unit that notifies an identifier of the broker node as a branch point node identifier to the rendezvous node when the branch point determination unit determines that the broker node is the branch point node.

6. The event delivery system according to claim 5, wherein the message transmission unit of the rendezvous node further includes
an upstream message transmission unit that, upon notification of the branch point node identifier from the broker node, adds the branch point node identifier to the event delivery route change message generated by the message generation unit and transmits the message to the broker node on the publisher node side.

7. The event delivery system according to claim 6, wherein the route detection unit of the broker node includes
an advertisement information table scanning unit that scans an advertisement information table storing the advertisement information upon receiving the event delivery route change message added with the branch point node identifier from the rendezvous node, and
an aggregation point determination unit that determines that the broker node is the aggregation point node when a plurality of adjacent transfer destinations related to the specific event information are registered in the advertisement information table scanned by the advertisement information table scanning unit.

8. The event delivery system according to claim 7, wherein the route construction unit of the broker node constructs the new delivery route by rewriting the branch point node identifier over the adjacent transfer destination registered in the advertisement information table when the aggregation point determination unit determines that the broker node is the aggregation point node.

9. A rendezvous node included in an event delivery system to deliver event information containing a content of an event generated in a publisher node to a subscriber node, comprising:
a traffic monitoring unit that monitors a traffic volume of the event information passing through the rendezvous node; and
a specific event determination unit that determines specific event information subject to load distribution from among the event information when the traffic volume monitored by the traffic monitoring unit exceeds a predetermined value.

10. The rendezvous node according to claim 9, wherein
the event information is composed of identification elements made up of a plurality of hierarchical levels, and
the specific event determination unit includes
an upper event identification unit that identifies a type of the event information with at least two levels of identification elements from a top of the hierarchy of the identification elements,
a traffic measurement unit that measures the traffic volume for each type of the event information identified by the upper event identification unit, and
an event detection unit that determines at least one event information in decreasing order of the traffic volume for each type of the event information measured by the traffic measurement unit as the specific event information.

11. The rendezvous node according to claim 9, wherein
the event information is composed of identification elements made up of a plurality of hierarchical levels, and
the specific event determination unit includes
a lower event identification unit that identifies a type of the event information with a lowest level of identification element in the hierarchy of identification elements,
a traffic measurement unit that measures the traffic volume for each type of the event information identified by the lower event identification unit, and
an event detection unit that determines at least one event information in decreasing order of the traffic volume for each type of the event information measured by the traffic measurement unit as the specific event information.

12. The rendezvous node according to claim 9, further comprising:
an information acquisition unit that acquires advertisement information related to the specific event information determined by the specific event determination unit;
a message generation unit that generates an event delivery route change message containing the advertisement information acquired by the information acquisition unit; and
a message transmission unit that transmits the event delivery route change message generated by the message generation unit to a broker node included in the event delivery system.

13. The rendezvous node according to claim 12, wherein
the message transmission unit includes a downstream message transmission unit that transmits the event delivery route change message generated by the message generation unit to the broker node on the subscriber node side.

14. The rendezvous node according to claim 13, wherein
the message transmission unit includes an upstream message transmission unit that, upon notification of a branch point node identifier from at least one of the broker node to which the event delivery route change message is transmitted, adds the branch point node identifier to the event delivery route change message and transmits the message to the broker node on the publisher node side.

15. A broker node included in an event delivery system to deliver event information containing a content of an event generated in a publisher node to a subscriber node, comprising:
a route detection unit that detects whether the broker node is an aggregation point node or a branch point node for changing a current delivery route of specific event information subject to load distribution from among the event information; and
a route construction unit that constructs a new delivery route of the specific event information going through the aggregation point node and the branch point node detected by the route detection unit, bypassing a rendezvous node included in the event delivery system.

16. The broker node according to claim 15, wherein
the route detection unit includes
a request information table scanning unit that scans a request information table storing request information issued by the subscriber node and requesting the event information upon receiving an event delivery route change message from the rendezvous node,
a branch point determination unit that determines that the broker node is the branch point node when a plurality of adjacent transfer destinations related to the specific event information are registered in the request information table scanned by the request information table scanning unit, and a notification unit that notifies an identifier of the broker node as a branch point node identifier to the rendezvous node when the branch point determination unit determines that the broker node is the branch point node.

17. The broker node according to claim 16, wherein the route detection unit includes
an advertisement information table scanning unit that scans an advertisement information table storing advertisement information issued by the publisher node and advertising the event upon receiving the event delivery route change message added with the branch point node identifier from the rendezvous node, and
an aggregation point determination unit that determines that the broker node is the aggregation point node when a plurality of adjacent transfer destinations related to the specific event information are registered in the advertisement information table scanned by the advertisement information table scanning unit.

18. The broker node according to claim 17, wherein the route construction unit constructs the new delivery route by rewriting the branch point node identifier over the adjacent transfer destination registered in the advertisement information table when the aggregation point determination unit determines that the broker node is the aggregation point node.

19. A load distribution method for an event distribution system comprising:
monitoring a traffic volume of event information issued by a publisher node that issues event information containing a content of a generated event and advertisement information advertising the event at a rendezvous node that makes information management related to a generated event;
determining specific event information subject to load distribution from among the event information when the traffic volume monitored by the traffic volume monitoring exceeds a predetermined value;
performing route detection for detecting an aggregation point node and a branch point node for changing a current delivery route of the specific event information determined by the specific event determination from among broker nodes that transfer the event information and the advertisement information issued by the publisher node and request information issued by a subscriber node that issues request information for receiving desired event information; and
performing route construction for constructing a new delivery route of the specific event information going through the aggregation point node and the branch point node detected by the route detection, bypassing the rendezvous node.

20. The load distribution method for an event distribution system according to claim 19, wherein
the event information is composed of identification elements made up of a plurality of hierarchical levels, and
the specific event determination includes
performing upper event identification for identifying a type of the event information with at least two levels of identification elements from a top of the hierarchy of the identification elements,
measuring the traffic volume for each type of the event information identified by the upper event identification, and
performing event detection for determining at least one event information in decreasing order of the traffic volume for each type of the event information measured by the traffic volume measurement as the specific event information.

21. The load distribution method for an event distribution system according to claim 19, wherein
the event information is composed of identification elements made up of a plurality of hierarchical levels, and
the specific event determination includes
performing lower event identification for identifying a type of the event information with a lowest level of identification element in the hierarchy of identification elements,
measuring the traffic volume for each type of the event information identified by the event identification, and
performing event detection for determining at least one event information in decreasing order of the traffic volume for each type of the event information measured by the traffic volume measurement as the specific event information.

22. The load distribution method for an event distribution system according to claim 21, comprising, after the specific event determination:
performing information acquisition for acquiring the advertisement information related to the specific event information determined by the specific event determination;
generating an event delivery route change message containing the advertisement information acquired by the information acquisition; and
performing downstream message transmission for transmitting the event delivery route change message generated by the event delivery route change message generation to the broker node on the subscriber node side with respect to the rendezvous node.

23. The load distribution method for an event distribution system according to claim 22, comprising, after the downstream message transmission:
performing branch point determination in the route detection for scanning a request information table of the broker node storing the request information upon receiving the event delivery route change message by the broker node on the subscriber node side with respect to the rendezvous node, determining that the broker node in which a plurality of adjacent transfer destinations related to the specific event information are registered in the request information table is the branch point node, and notifying an identifier of the broker node as a branch point node identifier to the rendezvous node.

24. The load distribution method for an event distribution system according to claim 23, comprising, after the branch point determination:
performing upstream message transmission in the message transmission for adding an identifier of the broker node determined to be the branch point node in the branch point determination as a branch point node identifier to the event delivery route change message, and transmitting the message to the broker node on the publisher node side with respect to the rendezvous node.

25. The load distribution method for an event distribution system according to claim 24, comprising, after the upstream message transmission,
performing aggregation point determination in the route detection for scanning an advertisement information table of the broker node storing the advertisement information upon receiving the event delivery route change message added with the branch point node identifier by the broker node on the publisher node side with respect to the rendezvous node, and determining that the broker node in which a plurality of adjacent transfer destinations related to the specific event information are registered in the advertisement information table is the aggregation point node.

26. The load distribution method for an event distribution system according to claim 25, wherein
the route construction constructs the new delivery route by rewriting the branch point node identifier over the adjacent transfer destination registered in the advertisement information table of the broker node serving as the aggregation point node detected in the route detection step.

27. A load distribution method for a rendezvous node, comprising:
monitoring a traffic volume of event information passing through a rendezvous node by the rendezvous node included in an event delivery system to deliver event information containing a content of an event generated in a publisher node to a subscriber node; and
determining specific event information subject to load distribution from among the event information when the traffic volume monitored by the traffic monitoring exceeds a predetermined value, wherein
the event information is composed of identification elements made up of a plurality of hierarchical levels, and
the specific event information determination includes
performing upper event identification for identifying a type of the event information with at least two levels of identification elements from a top of the hierarchy of the identification elements,
performing traffic measurement for measuring the traffic volume for each type of the event information identified by the upper event identification, and
performing event detection for determining at least one event information in decreasing order of the traffic volume for each type of the event information measured by the traffic measurement as the specific event information.

28. The load distribution method for a rendezvous node according to claim 27, wherein
the event information is composed of identification elements made up of a plurality of hierarchical levels, and
the specific event information determination includes
performing lower event identification for identifying a type of the event information with a lowest level of identification element in the hierarchy of identification elements,
performing traffic measurement for measuring the traffic volume for each type of the event information identified by the lower event identification, and
performing event detection for determining at least one event information in decreasing order of the traffic volume for each type of the event information measured by the traffic measurement as the specific event information.

29. The load distribution method for a rendezvous node according to claim 27, comprising, after the specific event information determination,
performing information acquisition for acquiring the advertisement information related to the specific event information determined by the specific event information determination,
generating an event delivery route change message containing the advertisement information acquired by the information acquisition, and
transmitting the event delivery route change message generated by the event delivery route change message generation to a broker node included in the event delivery system.

30. The load distribution method for a rendezvous node according to claim 29, wherein
the transmission of the event delivery route change message to the broker node includes downstream message transmission for transmitting the generated event delivery route change message to the broker node on the subscriber node side.

31. The load distribution method for a rendezvous node according to claim 30, wherein
the transmission of the event delivery route change message to the broker node includes upstream message transmission for, upon notification of a branch point node identifier from at least one of the broker node to which the event delivery route change message is transmitted, adding the branch point node identifier to the event delivery route change message and transmitting the message to the broker node on the publisher node side.

32. A delivery route construction method for a broker node, comprising:
performing route detection for detecting whether a broker node included in an event delivery system to deliver event information containing a content of an event generated in a publisher node to a subscriber node is an aggregation point node or a branch point node for changing a current delivery route of specific event information subject to load distribution from among the event information containing a content of an event generated in the publisher node, and
performing route construction for constructing a new delivery route of the specific event information going through the aggregation point node and the branch point node detected by the route detection, bypassing a rendezvous node included in the event delivery system to deliver the event information generated in the publisher node to the subscriber node.

33. The delivery route construction method for a broker node according to claim 32, wherein
the route detection includes branch point determination for scanning a request information table storing request information issued by the subscriber node and requesting the event information upon receiving an event delivery route change message from the rendezvous node, determining that the broker node is the branch point node when a plurality of adjacent transfer destinations related to the specific event information are registered in the request information table, and notifying an identifier of the broker node as a branch point node identifier to the rendezvous node.

34. The delivery route construction method for a broker node according to claim 33, wherein
the route detection includes aggregation point determination for scanning an advertisement information table storing advertisement information issued by the publisher node and advertising the event upon receiving the event delivery route change message added with the branch point node identifier from the rendezvous node, and determining that the broker node is the aggregation point node when a plurality of adjacent transfer destinations related to the specific event information are registered in the advertisement information table.

35. The delivery route construction method for a broker node according to claim 34, wherein the route construction constructs the new delivery route by rewriting the branch point node identifier over the adjacent transfer destination registered in the advertisement information table when the broker node is determined to be the aggregation point node in the aggregation point determination.

36. A non-transitory computer readable medium storing a load distribution program causing a computer to execute:
a traffic monitoring processing, by a traffic monitoring unit of a rendezvous node, for monitoring a traffic volume of event information containing a content of an event generated in a publisher node and passing through the rendezvous node; and
a specific event determination processing, by a specific event determination unit of the rendezvous node, for determining specific event information subject to load distribution from among the event information when the traffic volume monitored by the traffic monitoring unit exceeds a predetermined value, wherein
the event information is composed of identification elements made up of a plurality of hierarchical levels, and
the program causes a computer to execute, in the specific event determination processing,
an upper event identification processing, by an upper event identification unit included in the specific event determination unit, that identifies a type of the event information with at least two levels of identification elements from a top of the hierarchy of the identification elements,
a traffic measurement processing, by a traffic measurement unit included in the specific event determination unit, that measures the traffic volume for each type of the event information identified by the upper event identification unit, and
an event detection processing, by an event detection unit included in the specific event determination unit, that determines at least one event information in decreasing order of the traffic volume for each type of the event information measured by the traffic measurement unit as the specific event information.

37. The non-transitory computer readable medium storing the load distribution program according to claim 36, wherein
the event information is composed of identification elements made up of a plurality of hierarchical levels, and
the program causes a computer to execute, in the specific event determination processing,
a lower event identification processing, by a lower event identification unit included in the specific event determination unit, that identifies a type of the event information with a lowest level of identification element in the hierarchy of identification elements,
a traffic measurement processing, by a traffic measurement unit included in the specific event determination unit, that measures the traffic volume for each type of the event information identified by the lower event identification unit, and
an event detection processing, by an event detection unit included in the specific event determination unit, that determines at least one event information in decreasing order of the traffic volume for each type of the event information measured by the traffic measurement unit as the specific event information.

38. The non-transitory computer readable medium storing the load distribution program according to claim 36, wherein
the program causes a computer to execute, after the specific event determination processing,
an information acquisition processing, by an information acquisition unit of the rendezvous node, that acquires advertisement information related to the specific event information determined by the specific event determination step,
a message generation processing, by a message generation unit of the rendezvous node, that generates an event delivery route change message containing the advertisement information acquired by the information acquisition unit, and
a message transmission processing, by a message transmission unit of the rendezvous node, that transmits the event delivery route change message generated by the message generation unit to a broker node included in the event delivery system.

39. The non-transitory computer readable medium storing the load distribution program according to claim 38, wherein
the program causes a computer to execute, in the message transmission processing,
a downstream message transmission processing, by a downstream message transmission unit included in the message transmission unit, that transmits the event delivery route change message generated by the message generation unit to the broker node on the subscriber node side.

40. The non-transitory computer readable medium storing the load distribution program according to claim 39, wherein
the program causes a computer to execute, in the message transmission processing,
an upstream message transmission processing, by an upstream message transmission unit included in the message transmission unit, that, upon notification of a branch point node identifier from at least one of the broker node to which the event delivery route change message is transmitted, adds the branch point node identifier to the event delivery route change message and transmits the message to the broker node on the publisher node side.

41. A non-transitory computer readable medium storing a delivery route construction program causing a computer to execute:
a route detection processing, by a route detection unit included in a broker node, that detects whether the broker node is an aggregation point node or a branch point node for changing a current delivery route of specific event information subject to load distribution from among event information containing a content of an event generated in a publisher node; and
a route construction processing, by a route construction unit included in the broker node, that constructs a new delivery route of the specific event information going through the aggregation point node and the branch point node detected by the route detection unit, bypassing a rendezvous node included in the event delivery system.

42. The non-transitory computer readable medium storing the delivery route construction program according to claim 41, wherein
the program causes a computer to execute, in the route detection processing,
scanning, by a request information table scanning unit included in the route detection unit, a request information table storing request information issued by a subscriber node to which the event information is delivered and requesting the event information upon receiving an event delivery route change message from the rendezvous node, determining, by a branch point determination unit included in the route detection unit, that the broker node is the branch point node when a plurality of adjacent transfer destinations related to the specific event information are registered in the request information table, and notifying, by a notification unit included in the route detection unit, an identifier of the broker node as a branch point node identifier to the rendezvous node.

43. The non-transitory computer readable medium storing the delivery route construction program according to claim 42, wherein the program causes a computer to execute, in the route detection processing, scanning, by an advertisement information table scanning unit included in the route detection unit, an advertisement information table storing advertisement information issued by the publisher node and advertising the event upon receiving the event delivery route change message added with the branch point node identifier from the rendezvous node, and determining, by an aggregation point determination unit included in the route detection unit, that the broker node is the aggregation point node when a plurality of adjacent transfer destinations related to the specific event information are registered in the advertisement information table.

44. The non-transitory computer readable medium storing the delivery route construction program according to claim 43, wherein the program causes a computer to execute, in the route construction processing, constructing the new delivery route by rewriting the branch point node identifier over the adjacent transfer destination registered in the advertisement information table by the route construction unit when the broker node is determined to be the aggregation point node in the aggregation point determination processing.

* * * * *